United States Patent
Iwase et al.

(10) Patent No.: US 7,766,789 B2
(45) Date of Patent: Aug. 3, 2010

(54) CONTROL DEVICE FOR HYBRID VEHICLE DRIVE APPARATUS

(75) Inventors: Yuji Iwase, Mishima (JP); Takuma Kakinami, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/379,799

(22) Filed: Mar. 2, 2009

(65) Prior Publication Data

US 2010/0004089 A1  Jan. 7, 2010

Related U.S. Application Data

(63) Continuation of application No. 12/216,205, filed on Jul. 1, 2008, now abandoned.

(30) Foreign Application Priority Data

Jul. 2, 2007  (JP)  ............................. 2007-174486

(51) Int. Cl.
  B60W 10/06  (2006.01)
  B60W 10/10  (2006.01)
(52) U.S. Cl. ............................. 477/3; 477/98; 477/906
(58) Field of Classification Search ............... 477/4, 477/72
  See application file for complete search history.

(56) References Cited

U.S. PATENT DOCUMENTS

| 6,258,008 | B1 * | 7/2001 | Tabata et al. | ................. | 477/107 |
| 2004/0220015 | A1 * | 11/2004 | Murakami et al. | ............ | 477/15 |
| 2005/0202929 | A1 * | 9/2005 | Tsuneyoshi et al. | ............ | 477/5 |

FOREIGN PATENT DOCUMENTS

| JP | A-11-093725 | 4/1999 |
| JP | A-11-173171 | 6/1999 |
| JP | A-2006-105386 | 4/2006 |
| JP | A-2006-242095 | 9/2006 |
| JP | A-2006-242096 | 9/2006 |

* cited by examiner

Primary Examiner—Sherry L Estremsky
Assistant Examiner—Edwin A. Young
(74) Attorney, Agent, or Firm—Oliff & Berridge, PLC

(57) ABSTRACT

A control device for hybrid vehicle drive apparatus is disclosed. Upon receipt of a start-up request on an engine (8), if a determination is made that a rattling gear noise in a power distributing mechanism (16) exceeds a given value, first and second clutches (C1 and C2) are disengaged to cause a power transmitting path to be placed in a power interrupting state, and the first and second clutches (C1 and C2) are engaged to cause the power transmitting path to be placed in a non-differential state. Thus, engine start-up is initiated. This allows the engine (8) to be started up with a limited occurrence of rattling between gears incorporated in the power distributing mechanism (16) with a reduction in rattling gear noise.

14 Claims, 12 Drawing Sheets

| | C0 | C1 | C2 | B0 | B1 | B2 | B3 | SHIFTING RATIO | STEP |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | ○ | | 3.209 | |
| N | | | | | | | | | |

○ ENGAGED
◎ ENGAGED UPON STEP-VARIABLE
   RELEASED UPON CONTINUOUSLY-VARIABLE

CONTROL DEVICE FOR HYBRID VEHICLE DRIVE APPARATUS

This is a Continuation of application Ser. No. 12/216,205 filed Jul. 1, 2008, which claims priority of Japanese Application No. 2007-174486, filed Jul. 2, 2007. The entire disclosure of the prior applications is hereby incorporated by reference herein in its entirety.

TECHNICAL FIELD

The present invention relates to control devices for hybrid vehicle drive apparatuses. More particularly, it relates to a technology of minimizing the occurrence of noise impairing a comfort of a vehicle occupant in a hybrid vehicle drive apparatus having a differential mechanism operative to perform a differential action, and an electric motor.

BACKGROUND ART

There has been known a hybrid vehicle drive apparatus including an engine, a first electric motor, a second electric motor and a planetary gear mechanism which has a first rotary element connected to the engine, a second rotary element connected to the first electric motor and a third rotary connected to a power transmitting path connected to drive wheels, the second electric motor being connected to the power transmitting path. Such a hybrid vehicle drive apparatus is disclosed in, for instance, FIG. 1 of Patent Publication 1 (Japanese Patent Application Publication No. 2006-242096). With such a hybrid vehicle drive apparatus, one of possible tasks was to minimize rattling noise of gears, constituting the power transmitting path, which occurred during a start-up or a halt of the engine.

With a control device of the hybrid vehicle drive apparatus disclosed in Patent Publication 1, the gears are maintained in a rattling-free connection with the use of an output torque of the second electric motor. With the engine having no start-up request, if output torque of the second electric motor exceeds a given value, then, the engine is started up. In contrast, if output torque of the second electric motor is less than the given value, then, a determination is made that the rattling-free connection is inadequate. In this case, the engine stop operation is continuously conducted in line with conditions under which demanded torque of a driver is less than a given value, and a battery has a remnant state of charge SOC exceeding a given value. Further, if demanded torque exceeds the given value and the remnant state of charge SOC is less than the given value, the engine is started up regardless of the degree of the rattling-free connection.

Besides, there have been known other technologies as disclosed in Patent Publication 2 (Japanese Patent Application Publication No. 11-93725), Patent Publication 3 (Japanese Patent Application Publication No. 11-173171), Patent Publication 4 (Japanese Patent Application Publication No. 2006-105386) and Patent Publication 5 (Japanese Patent Application Publication No. 2006-242095).

With the control device of the hybrid vehicle drive apparatus disclosed in Patent Publication 1, it was likely that the engine start-up was initiated that is the engine is started up without achieving a reduction in rattling noise of the gears under various situations. These situations arise in: a first case wherein output torque of the second electric motor is less than a given value and demanded torque is less than a given value while the remnant state of charge of the battery is less than a given value; a second case wherein a determination is made based on multiple conditions and the engine start-up was unsuccessful; or a third case wherein an attempt is made to forcibly initiate the engine start-up regardless of whether the rattling-free connection is adequate.

SUMMARY OF THE INVENTION

The present invention has been completed with such a view in mind and has an object to provide a control device for a hybrid vehicle drive apparatus, having a differential mechanism operative to perform a differential action and an electric motor, which can minimize abnormal noise in the form of rattling noise like rattling gear noise of gears constituting a power transmitting path.

For achieving the above object, in a first aspect of the invention, the hybrid vehicle drive apparatus comprises (i) a continuously variable shifting portion including a differential mechanism, operative to distribute an output of an engine to a first electric motor and drive wheels, which serves as an electrically controlled continuously variable transmission; (ii) a connecting and disconnecting portion i.e. a connecting/disconnecting portion forming part of a power transmitting path and operative to selectively switch the power transmitting path in one of a power transmissive state in which a power transfer therethrough is allowed, and a power interrupting state in which the power transfer from the differential mechanism to the drive wheels is interrupted; and (iii) a differential state switching device disposed in the differential mechanism and operative to selectively switch the differential mechanism in one of a differential state to enable the continuously variable shifting portion to perform a continuously variable shifting action and a non-differential state disabling the continuously variable shifting action of the continuously variable shifting portion.

The control device is operative, if rattling noise in the differential mechanism exceeds a given value upon request of an engine start-up, to place the power transmitting path in the power interrupting state and to place the differential mechanism in the non-differential state after which the engine is started up.

In a second aspect of the invention, if the rattling noise in the differential mechanism is less than the given value, the control device places the differential mechanism in the differential state to permit the engine to start-up.

In a third aspect of the invention, if a temperature of the engine is less than a given engine temperature determining value, the control device determines that the rattling noise in the differential mechanism exceeds the given value.

In a fourth aspect of the invention, the differential state switching device is operative in response to a hydraulic pressure to selectively switch the differential mechanism in one of the differential state and the non-differential state; the hybrid vehicle drive apparatus includes an oil pump for supplying a hydraulic pressure to the differential state switching device; and the control device is operative to start-up the engine based on an increasing time of the hydraulic pressure produced by the oil pump.

In a fifth aspect of the invention, the hybrid vehicle drive apparatus comprises (i) a continuously variable shifting portion including a differential mechanism, operative to distribute an output of an engine to a first electric motor and drive wheels, which serves as an electrically controlled continuously variable transmission; (ii) a connecting/disconnecting portion forming part of a power transmitting path and operative to selectively switch the power transmitting path in one of a power transmitting state in which a power transfer therethrough is allowed, and a power interrupting state in which the power transfer from the differential mechanism to the drive wheels is interrupted; and (iii) a differential state switching device disposed in the differential mechanism and operative to selectively switch the differential mechanism in one of a differential state to enable the continuously variable shifting portion to perform a continuously variable shifting action and a non-differential state disabling the continuously variable shifting action of the continuously variable shifting portion.

The control device is operative, if rattling noise in the differential mechanism exceeds a given value upon request of an engine stop, to place the power transmitting path in the power interrupting state and to place the differential mechanism in the non-differential state after which the engine is stopped.

In a sixth aspect of the invention, the control device is operative to place the differential mechanism in the differential state to permit the engine to stop, when the rattling noise in the differential mechanism is less than the given value.

In a seventh aspect of the invention, the control device places the differential mechanism in the differential state to allow the engine to stop, when a temperature of lubricating oil for lubricating the differential mechanism exceeds a given oil temperature determining value.

In a eighth aspect of the invention, the differential mechanism includes a first rotary element connected to the engine in the power transmissive state, a second rotary element connected to the first electric motor in the power transmissive state, and a third rotary element connected to the connecting/disconnecting portion; and in the non-differential state of the differential mechanism, the differential state switching device limits or restricts a relative rotation of at least two rotary elements among the first to third rotary elements.

In a ninth aspect of the invention, the control device is operative, when the differential mechanism is placed in the differential state to start-up the engine, the third rotary element is fixedly retained and a rotation speed of the second rotary element is increased by the first electric motor for thereby increasing a rotation speed of the engine.

In a tenth aspect of the invention, the hybrid vehicle drive apparatus further comprises a second electric motor connected to the power transmitting path, and either one of or both of the first and second electric motors are driven to increase a rotation speed of the engine upon starting up the engine.

In a eleventh aspect of the invention, the hybrid vehicle drive apparatus comprises (i) a continuously variable shifting portion including a differential mechanism, operative to distribute an output of an engine to a first electric motor and drive wheels, which serves as an electrically controlled continuously variable transmission; (ii) a connecting/disconnecting portion forming part of a power transmitting path and operative to selectively switch the power transmitting path in one of a power transmissive state in which a power transfer therethrough is allowed, and a power interrupting state in which the power transfer from the differential mechanism to the drive wheels is interrupted; (iii) a differential state switching device disposed in the differential mechanism and operative to selectively switch the differential mechanism in one of a differential state to enable the continuously variable shifting portion to perform a continuously variable shifting action and a non-differential state disable the continuously variable shifting action of the continuously variable shifting portion; and (iv) the differential mechanism including a first rotary element connected to the engine in the power transmissive state, a second rotary element connected to the first electric motor in the power transmissive state, and a third rotary element connected to the connecting/disconnecting portion.

The control device is operative, when rattling noise in the differential mechanism exceeds a given value upon a stop request of the engine for stopping the engine, to place the power transmitting path in the power interrupting state and to place the differential mechanism in the differential state, the control device decreasing a rotation speed of the engine with the third rotary element fixedly retained and a reactive force in opposition to a drop in rotation speed of the second rotary element output by the first electric motor.

According to the first aspect of the invention, upon receipt of the engine start-up request, if rattling noise in the differential mechanism exceeds the given value, then, the power transmitting path is placed in the power interrupting state and the differential mechanism is placed in the non-differential state after which the engine is started up. This enables the engine to be started up with a status of the differential mechanism wherein rattling in gears thereof is limited or restricted. This reduces rattling noise of the gears incorporated in the differential mechanism, under which the engine can be started up. As used herein, preferably, the term "given value" i.e. "predetermined value" related to rattling noise refers to an upper limit value in noise level of predetermined rattling noise to be used for avoiding a comfort of a vehicle occupant from being impaired.

With the second aspect of the invention, the differential mechanism is placed in the differential state if rattling noise therein is less than the given value, to permit the engine start-up. If no need arises for operating the differential state switching device to place the differential mechanism in the non-differential state, the differential state switching device not is operated, and is appropriately operated when needed.

With the third aspect of the invention, if the temperature of the engine is less than the given engine temperature determining value, the determination is made that rattling noise in the differential mechanism exceeds the given value. Thus, whether or not rattling noise in the differential mechanism exceeds the given value can be easily determined.

With the fourth aspect of the invention, the differential state switching device is operative in response to the hydraulic pressure to selectively switch the differential mechanism in one of the differential state and the non-differential state, whereby the engine is started up depending on time in raising the hydraulic pressure generated by the oil pump. Therefore, when the differential state switching device operates to switch the differential mechanism to the non-differential state, even if a time for increasing the hydraulic pressure becomes long, the engine is prevented from being started up before the operational completion of the differential state switching device.

With the fifth aspect of the invention, upon request of the engine stop, if rattling noise in the differential mechanism exceeds the given value, the power transmitting path is placed in the power interrupting state and the differential mechanism is placed in the non-differential state, after which the engine is stopped. This allows the engine to be stopped in operation with limited or restricted occurrence of rattling in gears of the differential mechanism, with a reduction in rattling noise.

With the sixth aspect of the invention, the control device is operative to place the differential mechanism in the differential state to permit the engine to stop when rattling noise in the differential mechanism is less than the given value. Thus, if the differential state switching device need not operative to place the differential mechanism in the non-differential state, it is not operated. The differential state switching device is appropriately rendered operative only when needed.

With the seventh aspect of the invention, the control device is operative to place the differential mechanism in the differential state to allow the engine to stop when the temperature of lubricating oil for lubricating the differential mechanism exceeds the given oil temperature determining value. Thus, when the gears of the differential mechanism are susceptible to rattle due to viscosity drop of lubricating oil, the differential mechanism is placed in the non-differential state. The differential state switching device operative is properly rendered when needed.

With the eighth aspect of the invention, in the non-differential state of the differential mechanism, the differential state the switching device limits or restricts the relative rotation of at least two rotary elements among the first to third rotary elements. This suppresses the occurrence of rattling between associated rotary elements of the differential mechanism. Thus, during the start-up or stop of the engine, placing the differential mechanism in the non-differential state enables a reduction in rattling noise resulting therefrom.

As used herein, preferably, the expression "relative rotation of the rotary elements is restricted with the differential state switching device" means the fact that the relative rotation of the rotary elements is arranged to have an upper limit, or the fact that the upper limit already provided on such a relative rotation is lowered.

With the ninth aspect of the invention, the control device operates as follows. When the differential mechanism is placed in the differential state to start-up the engine, the third rotary element is fixedly retained and the rotation speed of the second rotary element is increased by the first electric motor, for thereby increasing the rotation speed of the engine. This enables the engine to start-up without rendering the differential state switching device operative.

With the tenth aspect of the invention, upon starting up the engine, either one of or both of the first and second electric motors are driven to increase the rotation speed of the engine. This reduces biased load applied on one electric motor.

With the eleventh aspect of the invention, the control device is operative, when rattling noise in the differential mechanism exceeds the given value in presence of the stop request on the engine upon stopping the engine, to place the power transmitting path in the power interrupting state and to place the differential mechanism in the differential state. This allows the third rotary element to be fixedly retained. This causes a reactive force in opposition to the drop in rotation speed of the second rotary element is output by the first electric motor, thereby decreasing the rotation speed of the engine. Thus, during stopping the engine, the rotation speed of the engine can be lowered with the suppressed occurrence of rattling between gears of the differential mechanism, reducing in rattling noise caused thereby.

BEST MODE FOR CARRYING OUT THE INVENTION

Now, various embodiments of the present invention will be described below in detail with reference to accompanying drawings.

First Embodiment

Figures 1, 2:
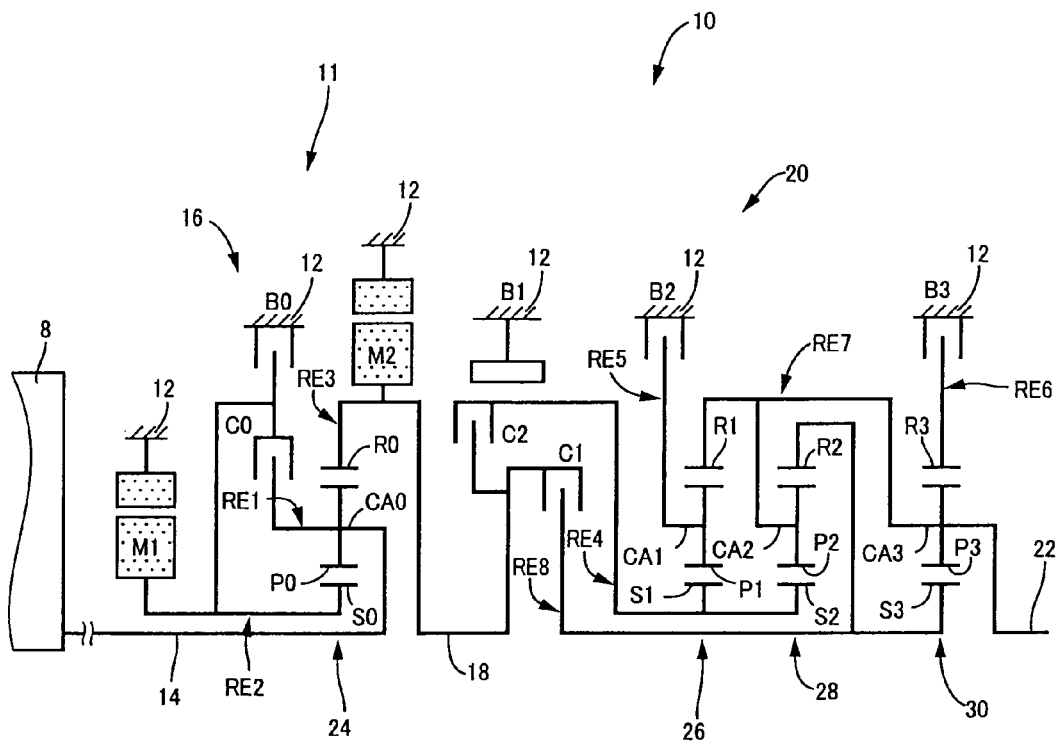
FIG. 1 is a skeleton view illustrating a structure of a vehicular hybrid vehicle drive apparatus to which a control device of the present invention is applied.
FIG. 2 is an engagement operation table illustrating the relationship between a shifting operation, in which the hybrid vehicle drive apparatus, shown in FIG. 1, is placed in a continuously variable or step-variable shifting state, and the operation of a hydraulically operated friction engaging device in combination.

FIG. 1 is a skeleton view illustrating a shifting mechanism 10, forming part of a drive apparatus for a hybrid vehicle, to which a control device of the present invention is applied. As shown in FIG. 1, the shifting mechanism 10 includes an input shaft 14, a differential portion 11 and an automatic shifting portion 20, which are connected to an output shaft 22 in series. The input shaft 14 is disposed in a transmission case (hereinafter referred to as "case 12") mounted on a vehicle body as a non-rotary member so as to extend on a common axis to function as an input rotary member. The differential portion 11 is coupled to the input shaft 14 in a direct connection or through a pulsation absorbing damper (vibration damping device) which is not shown. The automatic shifting portion 20 is connected to a power transmitting path between the differential portion 11 and drive wheels 38 (see FIG. 7) via a power transmitting member (power transmitting shaft) 18 to serve as an output rotary member.

Figure 7:
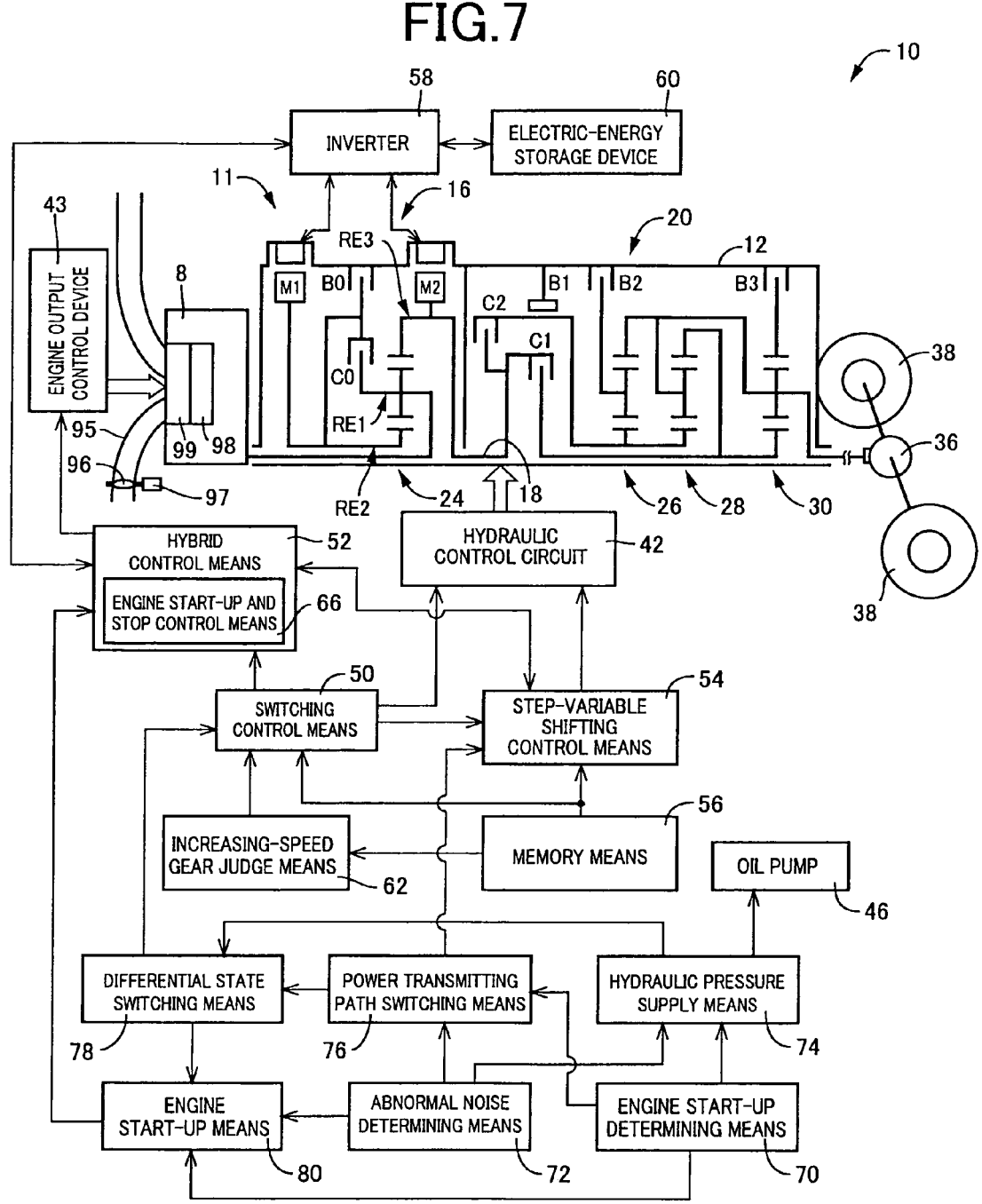
FIG. 7 is a functional block diagram illustrating a major control function to be executed by the electronic control device shown in FIG. 4.

The shifting mechanism 10 is of a type, preferably applicable to a vehicle of an FR type (front-engine rear-drive type) vehicle, which is disposed between an engine 8, i.e., an internal combustion engine such as a gasoline engine or a diesel engine serving as a drive-force source directly connected to the input shaft 14 or indirectly connected thereto via the pulsation absorbing damper, and a pair of drive wheels 38 (FIG. 7). This allows the engine 8 to deliver a vehicle drive force to the pair of drive wheels 38 in sequence via a differential gear device (final speed reduction gear) 36 and a pair of drive axles.

With the shifting mechanism 10 of such a structure, the engine 8 and the differential portion 11 are connected to each other in a direct connection. As used herein, the term "direct connection" may refer to a connection established without intervening any fluid-type transmitting device such as a torque converter or a fluid coupling. The connection, in which the vibration damping device intervenes, is involved in the direct connection. In addition, the shifting mechanism 10 has a structure with upper and lower halves arranged in symmetric relation with respect to an axis of the shifting mechanism 10 and, hence, the lower half is omitted from the skeleton view of FIG. 1.

The differential portion 11, corresponding to a continuously variable shifting portion of the present invention, is a mechanical mechanism through which an output of the engine 8 input to the input shaft 14 is mechanically distributed. To this end, the differential portion 11 includes a power distributing mechanism 16, serving as a differential mechanism through which the output of the engine 8 is distributed to a first electric motor M1 and the power transmitting member 18, and a second electric motor M2 disposed to be unitarily rotatable with the power transmitting member 18. Also, the first and second electric motors M1 and M2 are so-called motor/generators each having a function even as an electric power generator. The first electric motor M1 has at least one function to serve as an electric power generator that generates a reactive force, and the second electric motor M2 has at least a function to serve as an electric motor serving as a drive-force source to generate a drive force to run or to drive the vehicle.

The power distributing mechanism 16, corresponding to the differential mechanism of the present invention, mainly includes a differential-portion planetary gear unit 24 of a single pinion type having a given gear ratio $\rho 0$ in the order of, for instance, about "0.418", a switching clutch C0 and a switching brake B0. The differential-portion planetary gear unit 24 includes rotary elements (elements), such as a differential-portion sun gear S0, differential-portion planetary gears P0, a differential-portion carrier CA0 supporting the differential-portion planetary gears P0 to be rotatable about its axis and about the axis of the differential-portion sun gear S0, and a differential-portion ring gear R0 held in meshing engagement with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio $\rho 0$ is expressed as ZS0/ZR0.

With the power distributing mechanism 16 of such a structure, the differential-portion carrier CA0 is connected to the input shaft 14, i.e., the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. Upon disengagements of both the switching clutch C0 and the switching brake B0, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other in an operative state to enable the initiation of a differential action, i.e., a differential state under which the differential action is effectuated.

Thus, the output of the engine 8 is distributed to the first electric motor M1 and the power transmitting member 18 with a part of the output of the engine 8 rendering the first electric motor M1 operative to generate electric energy to be charged to a battery or to drivably rotate the second electric motor M2. This renders the differential portion 11 (power distributing mechanism 16) operative to serve as an electrically controlled differential device. Thus, the differential portion 11 is placed in a so-called continuously variable shifting state (electrically controlled CVT state), under which the power transmitting member 18 is caused to rotate at continuously varying speeds regardless of the engine 8 operating at a given rotation speed. That is, if the power distributing mechanism 16 is placed in the differential state, then, the differential portion 11 is placed in a differential state. In this casing, the differential portion 11 is placed in a continuously variable shifting state to function as an electrically controlled continuously variable transmission to continuously vary a speed ratio $\gamma 0$ (a ratio of rotation speed of input shaft 14 to rotation speed of power transmitting member 18) in a value ranging from a minimum value $\gamma 0 min$ to a maximum value $\gamma 0 max$.

Under such a state, if the switching clutch C0 or the switching brake B0 is engaged, the power distributing mechanism 16 is placed in a non-differential state in which the differential action is disenabled, i.e., no differential action is effectuated. In particular, if the switching clutch C0 is engaged to cause the differential-portion sun gear S0 and the differential-portion carrier CA0 to be unitarily coupled to each other, the power distributing mechanism 16 is placed in a locked state to assume the non-differential state in which no differential action is effectuated. Under such condition, the differential-portion sun gear S0, the differential-portion carrier CA0 and the differential-portion ring gear R0, serving as the three elements of the differential-portion planetary gear unit 24, are caused to rotate together, i.e., in a unitarily rotating state. This causes the differential portion 11 to be placed in the non-differential state. In this case, the rotation speeds of the engine 8 and the power transmitting member 18 match each other, so that the differential portion 11 (power distributing mechanism 16) is placed in a fixed shifting state, i.e., a step-variable shifting state to function as a transmission with a speed ratio γ0 fixed at "1".

Instead of engaging the switching clutch C0, next, if the switching brake B0 is engaged to connect the differential-portion sun gear S0 to the casing 12, then, the power distributing mechanism 16 is placed in the locked state with the differential-portion sun gear S0 being placed in a non-rotary state under the non-differential state. Under such state, the differential action is disabled, causing the differential portion 11 to be placed in the non-differential state. Further, the differential-portion ring gear R0 is caused to rotate at a speed higher than that of the differential-portion carrier CA0, causing the power distributing mechanism 16 to function as a speed-increasing mechanism. In this case, the differential portion 11 (power distributing mechanism 16) is placed in the fixed shifting state, i.e., the step-variable shifting state to perform a function as a speed-increasing transmission with the speed ratio γ0 fixed to a value smaller than "1", i.e., for example, about "0.7".

With the present embodiment, the switching clutch C0 and the switching brake B0 collectively serve as a differential state switching device for selectively switching the shifting state of differential portion 11 (power distributing mechanism 16) between the differential state, i.e., an unlocked state and the non-differential state, i.e., the locked state. In other words, the differential state, i.e., the unlocked state of the differential portion 11 (power distributing mechanism 16) represents a differential state under which the differential portion 11 is rendered operative to serve as an electrically controlled differential device, i.e., for instance, a continuously variable shifting state enabling an electrically controlled continuously variable shifting action to be initiated to render the differential portion 11 operative to serve as a continuously variable transmission with a speed ratio being continuously variable.

In contrast, the non-differential state, i.e., the locked state of the differential portion 11 (power distributing mechanism 16) represents a shifting state under which no electrically controlled continuously variable shifting action is initiated, i.e., for instance, a locked state under which the differential portion 11 is rendered inoperative to serve as the continuously variable transmission to disable the continuously variable shifting operation with a speed ratio locked at a fixed level. That is, this represents a fixed shifting state (non-differential state) under which no electrically controlled continuously variable shifting action is initiated to cause the differential portion 11 to operate as a transmission of a single-stage or a multi-stage with a speed ratio of one kind or a speed ratio of more than two kinds, i.e., under which the electrically controlled continuously variable shifting action is disabled. In other words, this represents the fixed shifting state under which the differential portion 11 is rendered operative as the transmission of the single-stage or the multi-stage with the speed ratio being kept at a fixed level. Also, the switching clutch C0 corresponds to the differential state switching device of the present invention.

The automatic shifting portion 20 is a shifting portion serving as a step-variable automatic transmission with a speed ratio (a ratio of rotation speed $N_{18}$ of power transmitting member 18 to rotation speed $N_{OUT}$ of output shaft 22) enabled to vary step-by-step. The automatic shifting portion 20 includes a first planetary gear unit 26 of a single-pinion type, a second planetary gear unit 28 of a single-pinion type and a third planetary gear unit 30 of a single-pinion type.

The first planetary gear unit 26 includes a first sun gear S1, first planetary gears P1, a first carrier CA1 supporting the first planetary gears P1 to be rotatable about their axes and about the axis of the first sun gear S1, and a first ring gear R1 held in meshing engagement with the first sun gear S1 via the first planetary gears P1, having a given gear ratio ρ1 of, for instance, about "0.562". The second planetary gear unit 28 includes a second sun gear S2, second planetary gears P2, a second carrier CA2 supporting the second planetary gears P2 to be rotatable about their axes and about the axis of the second sun gear S2, and a second ring gear R2 held in meshing engagement with the second sun gear S2 via the second planetary gears P2, having a given gear ratio ρ2 of, for example, about "0.425".

The third planetary gear unit 30 includes a third sun gear S3, third planetary gears P3, a third carrier CA4 supporting the third planetary gears P3 to be rotatable about their axes and about the axis of the third sun gear S3, and a third ring gear R3 R1 held in meshing engagement with the third sun gear S3 through the third planetary gears P3 having a given gear ratio ρ3 of, for instance, about "0.421". With the first sun gear S, the first ring gear R1, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios ρ1, ρ2 and ρ3 are represented by ZS1/ZR1, ZS2/ZR2, and ZS3/ZR3, respectively.

With the automatic shifting portion 20, the first sun gear S1 and the second sun gear S2 are unitarily coupled to each other and selectively connectable to the power transmitting member 18 through a second clutch C2 while selectively connectable to the casing 12 through a first brake B1. The first carrier CA1 is selectively connectable to the casing 12 through a second brake B2 and the third ring gear R3 is selectively connectable to the casing 12 through a third brake B3. The first ring gear R1, the second carrier CA2 and the third carrier CA3 are unitarily coupled to each other and also connected to the output shaft 22. The second ring gear R2 and the third sun gear S3 are unitarily coupled to each other and selectively connectable to the power transmitting member 18 through the first clutch C1.

Thus, the automatic shifting portion 20 and the power transmitting member 18 are selectively connected to each other through the first clutch C1 or the second clutch C2 used for the automatic shifting portion 20 to establish a gear shift position. In other words, the first and second clutches C1 and C2 collectively function as an engaging device for switching a connecting state between the power transmitting member 18 and the automatic shifting portion 20. That is, such an engaging device selectively switches a power transmitting path between the differential portion 11 (power transmitting member 18) and the drive wheels 38 in a power transmitting state, enabling a power transfer through the power transmission path, and a power interrupting state interrupting the power transfer through the power transmission path. That is, upon engagement of at least one of the first and second clutches C1 and C2, the power transmitting path is placed in the power transmitting state. In contrast, upon disengagement of the first and second clutches C1 and C2, the power transmitting path is placed in the power interrupting state.

The switching clutch C0, the first clutch C1, the second clutch C2, the switching brake B0, the first brake B1, the second brake B2 and the third brake B3 are hydraulically operated friction engaging devices used in a vehicular step-variable type automatic transmission of the related art. Examples of the friction engaging devices include a wet-type multiple-disc type engaging device, composed of a plurality of superposed friction plates adapted to be pressed against each other with a hydraulic actuator, and a band brake comprised of a rotary drum having an outer circumferential periphery on which one band or two bands are wound to be tightened at one ends with a hydraulic actuator. Such a friction engaging device is interposed between associated component members to selectively couple these members depending on needs.

With the shifting mechanism 10 of such a structure discussed above, the switching clutch C0, the first clutch C1, the second clutch C2, the switching brake B0, the first brake B1, the second brake B2 and the third brake B3 are selectively engaged in operation as indicated in an engagement operation table shown in FIG. 2. This selectively results in establishment of either one of a 1st-speed gear position (1st-speed gear shift position) to a 5th-speed gear position (5th-speed gear shift position) or one of a reverse-drive gear position (reverse-drive gear shift position) and a neural position. Thus, a speed ratio γ (input-shaft rotation speed $N_{IN}$/output-shaft rotation speed $N_{OUT}$) is obtained in nearly varying equal ratio for each gear position.

In particular, with the present embodiment 1, the power distributing mechanism 16 incorporates the switching clutch C0 and the switching brake B0, either one of which is engaged in operation causing the differential portion 11 to be placed in the continuously variable shifting state. This enables the differential portion 11 to operate as the continuously variable transmission as described above. In addition to such a function, the differential portion 11 is possible to be placed in the fixed shifting state to act as the transmission with a speed ratio kept at a fixed level. Accordingly, upon engagement of either the switching clutch C0 or the switching brake B0, the shifting mechanism 10 is placed in the step-variable shifting state under which the differential portion 11, placed in the fixed shifting state, and the automatic shifting portion 20 operate as the step-variable transmission. Upon disengagement of both the switching clutch C0 and the switching brake B0, the shifting mechanism 10 is placed in the continuously variable shifting state under which the differential portion 11 placed in the continuously variable shifting state, and the automatic shifting portion 20 operate as the electrically controlled continuously variable transmission.

In other words, causing either the switching clutch C0 or the switching brake B0 to engage allows the shifting mechanism 10 to be switched in the step-variable shifting state. In contrast, causing both the switching clutch C0 and the switching brake B0 to disengage allows the shifting mechanism 10 to be switched in the continuously variable shifting state. Thus, it can be said that the differential portion 11 is a transmission enabled to select one of the step-variable shifting state and the continuously variable shifting state.

If the shifting mechanism 10 is caused to function as, for instance, the step-variable transmission, causing the switching clutch C0, the first clutch C1 and the third brake B3 to engage, as indicated in FIG. 2, results in the establishment of a 1st-speed gear position with a speed ratio γ1 having a maximum value of, for instance, about "3.357". Engaging the switching clutch C0, the first clutch C1 and the second brake B2 results in the establishment of a 2nd-speed gear position with a speed ratio γ2 of, for instance, about "2.180", which is lower than that of the 1st-speed gear position. Engaging the switching clutch C0, the first clutch C1 and the first brake B1 results in the establishment of a 3rd-speed gear position with a speed ratio γ3 of, for instance, about "1.424", which is lower than that of the 2nd-speed gear position.

Engaging the switching clutch C0, the first clutch C1 and the second clutch C2 results in the establishment of a 4th-speed gear position with a speed ratio γ4 of, for instance, about "1.000", which is lower than that of the 3rd-speed gear position. Upon engagements of the first clutch C1, the second clutch C2 and the switching brake B0, a 5th-speed gear position is established with a speed ratio γ5 of, for example, about "0.705", which is smaller than that of the 4th-speed gear position.

Upon engagements of the second clutch C2 and the third brake B3, a reverse-drive gear position is established with a speed ratio γR of, for example, about "3.209", which lies at a value between those of the 1st- and 2nd-speed gear positions. For a neutral "N" state to be established, for instance, all of the clutches C0, C1 and C2 and the brakes B0, B1, B2 and B3 are disengaged. In addition, the first and second clutches C1 and C2, incorporated in the automatic shifting portion 20, serve as clutch engaging elements, collectively forming a part of the power transmitting path between the differential portion 11 (power distributing mechanism 16) and the drive wheels 38, which can disconnect the power transmitting path. Thus, the clutch engaging elements can be said to be a claimed power connecting/disconnecting portion.

However, if the shifting mechanism 10 is caused to function as the continuously variable transmission, both the switching clutch C0 and the switching brake B0 are disengaged as indicated on the engagement operation table shown in FIG. 2. This causes the differential portion 11 to be rendered operative to function as the continuously variable transmission and the automatic shifting portion 20 connected thereto in series, to be rendered operative to function as the step-variable transmission. Thus, the automatic shifting portion 20 can be shifted into the 1st-speed to 4th-speed gear positions under which the rotation speed, input to the automatic shifting portion 20, i.e., the rotation speed of the power transmitting member 18 is continuously varied for each gear position. This allows each gear position to have a continuously variable speed ratio. Accordingly, the speed ratio across the adjacent gear positions can be made continuously variable, obtaining a continuously variable total speed ratio (overall speed ratio) γT for the shifting mechanism 10 as a whole.

Figure 3:
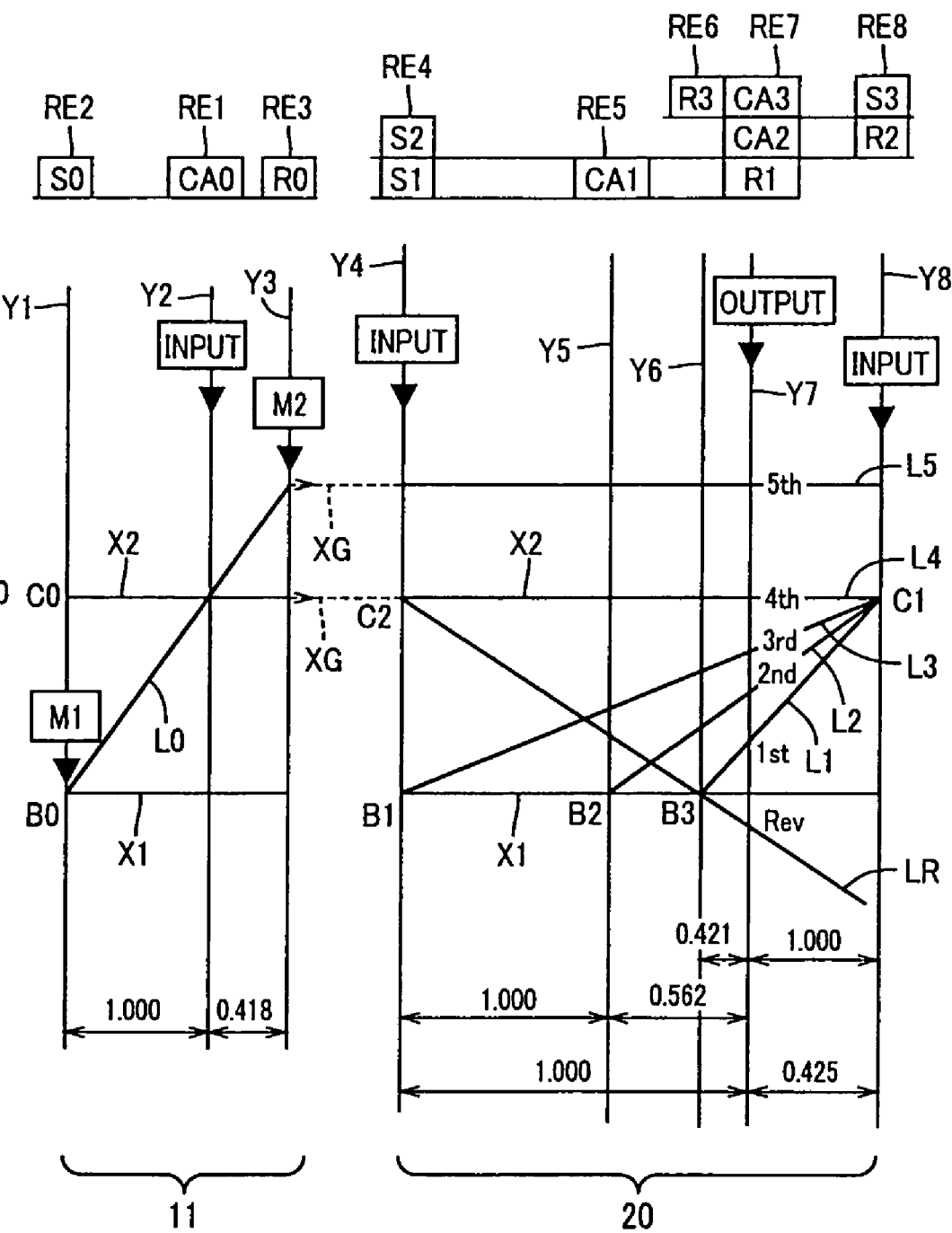
FIG. 3 is a collinear chart illustrating the relative rotation speed of rotary elements in each of different gear positions when the hybrid vehicle drive apparatus, shown in FIG. 1, is caused to operate in the step-variable shifting state.

FIG. 3 shows a collinear chart representing the correlations among the rotation speeds of various rotary elements, placed in different connecting states depending on respective gear positions, in straight lines for the shifting mechanism 10 comprised of the differential portion 11 functioning as a continuously variable shifting portion or a first shifting portion, and the automatic shifting portion 20 functioning as the step-variable shifting portion or a second shifting portion. The collinear chart, shown in FIG. 3, represents a two-dimensional coordinate system having the horizontal axis, representing the relationship on the gear ratios ρ established with the planetary gear units 24, 26, 28 and 30, and the vertical axis representing relative rotation speeds of the rotary elements. Among three horizontal lines, the lowermost horizontal line X1 indicates the rotation speed laying at a value of "0" and an upper horizontal line X2 indicates the rotation speed laying at a value of "1.0", that is, a rotation speed $N_E$ of the engine 8 connected to the input shaft 14. The uppermost horizontal line XG indicates the rotation speed of the power transmitting member 18.

Starting from the left in sequence, three vertical lines Y1, Y2 and Y3, corresponding to the three elements of the power distributing mechanism 16 forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. An interval between adjacent ones of the vertical lines Y1, Y2 and Y3 is determined in accordance with the gear ratio ρ0 of the differential-portion planetary gear unit 24.

Starting from the left in sequence, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier CA1 corresponding to a fifth rotary element (fifth element) RE5, the third ring gear R3 corresponding to a sixth rotary element (sixth element) RE6, the first ring gear R1 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between adjacent ones of the vertical lines Y4 to Y8 is determined based on the gear ratios ρ1, ρ2 and ρ3 of the first to third planetary gear units 26, 28 and 30.

In the relationship between the vertical lines on the collinear chart, if an interval between the sun gear and the carrier has a value corresponding to "1", then, the interval between the carrier and the ring gear is allocated to have a value corresponding to the gear ratio ρ of the planetary gear unit. That is, for the differential portion 11, an interval between the vertical lines Y1 and Y2 is set to a value of "1" and an interval between the vertical lines Y2 and Y3 is set to a value corresponding to the gear ratio "ρ". For each of the first to third planetary gear units 26, 28 and 30 of the automatic shifting portion 20, further, an interval between the sun gear and the carrier is set to a value of "1" and an interval between the carrier and the ring gear is set to a value corresponding to the gear ratio "ρ".

To express the structure upon using the collinear chart shown in FIG. 3, the shifting mechanism 10 of the present embodiment is arranged to have the power distributing mechanism 16 (continuously variable shifting portion 11). With such a structure, the differential-portion planetary gear unit 24 has the first rotary element RE1 (differential-portion carrier CA0) connected to the input shaft 14, i.e., the engine 8, while selectively connectable to the second rotary element RE2 (differential-portion sun gear S0) through the switching clutch C0. The second rotary element RE2 is connected to the first electric motor M1 while selectively connectable to the casing 12 through the switching brake B0. The third rotary element RE3 (differential-portion ring gear R0) is connected to the power transmitting member 18 and the second electric motor M2. Thus, the rotation of the input shaft 14 is transmitted (input) to the automatic shifting portion (step-variable shifting portion) 20 through the power transmitting member 18. In this case, a sloping straight line L0, passing across an intersecting point between the lines Y2 and X2, represents the relationship between the rotation speed of the differential-portion sun gear S0 and the rotation speed of the differential-portion ring gear R0.

If the switching clutch C0 and the switching brake B0 are disengaged, the differential portion 11 is switched to the continuously variable shifting state (differential state). In this case, controlling the rotation speed of the first electric motor M1 results in an increase or a decrease in the rotation speed of the differential-portion sun gear S0 represented by an intersecting point between the straight line L0 and the vertical line Y1. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease. Further, if the switching clutch C0 is engaged, then, the differential-portion sun gear S0 and the differential-portion carrier CA0 are coupled to each other. This allows the power distributing mechanism 16 to be brought into the non-differential state with the three rotary elements caused to unitarily rotate as one unit. Thus, the straight line L0 is caused to match the horizontal line X2, so that the power transmitting member 18 is caused to rotate at the same rotation speed as the engine rotation speed $N_E$.

In contrast, if the switching brake B0 is engaged, the rotation of the differential-portion sun gear S0 is halted. This causes the power distributing mechanism 16 to be brought into the non-differential state to function as the speed increasing mechanism and the straight line L0 assuming a state shown in FIG. 3. Thus, the rotation of the differential-portion ring gear R0, i.e., the rotation of the power transmitting member 18, represented by an intersecting point between the straight line L0 and the vertical line Y3, is input to the automatic shifting portion 20 at a rotation speed higher than the engine rotation speed $N_E$.

With the automatic shifting portion 20, the fourth rotary element RE4 is selectively connectable to the power transmitting member 18 through the second clutch C2 and selectively connectable to the casing 12 through the first brake B1. The fifth rotary element RE5 is selectively connectable to the casing 12 through the second brake B2 and the sixth rotary element RE6 is selectively connectable to the casing 12 through the third brake B3. The seventh rotary element RE7 is connected to the output shaft 22 and the eighth rotary element RE8 is selectively connectable to the power transmitting member 18 through the first clutch C1.

With the automatic shifting portion 20, as shown in FIG. 3, engaging the first clutch C1 and the third brake B3 allows the rotation speed of the output shaft 22 for the 1st-speed gear position to be represented by an intersecting point between a sloping straight line L1 and the vertical line Y7. Here, the sloping straight line L1 passes across an intersecting point between the vertical line Y8, representing the rotation speed of the eighth rotary element RE8, and the horizontal line X2, and an intersecting point between the vertical line Y6, indicative of the rotation speed of the sixth rotary element RE6, and the horizontal line X1. The vertical line Y7 represents the rotation speed of the seventh rotary element RE7 connected to the output shaft 22.

Similarly, the rotation speed of the output shaft 22 for the 2nd-speed gear position is represented by an intersecting point between a sloping straight line L2, determined upon engagements of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between a sloping straight line L3, determined upon engagements of the first clutch C1 and the first brake B1, and the vertical line Y7 indicative of the rotation speed of the seventh rotary element RE7 connected to the output shaft 22. The rotation speed of the output shaft 22 for the 4th-speed gear position is represented by an intersecting point between a horizontal straight line L4, determined upon engagements of the first and second clutches C1 and C2, and the vertical line Y7 indicative of the rotation speed of the seventh rotary element RE7 connected to the output shaft 22.

For the 1st-speed to 4th-speed gear positions, the switching clutch C0 remains engaged. Therefore, the drive force, applied to the differential portion 11, i.e., the power distributing mechanism 16, is input to the eighth rotary element RE8 at the same rotation speed as the engine rotation speed $N_E$. However, in place of engaging the switching clutch C0, if the switching brake B0 is engaged, then, the drive force, applied to the differential portion 11, is input at a higher rotation speed than the engine rotation speed $N_E$. Thus, the rotation speed of the output shaft 22 for the 5th-speed gear position is represented by an intersecting point between a horizontal straight line L5 and the vertical line Y7. Here, the horizontal straight line L5 is determined upon engagement of the first clutch C1, the second clutch C2 and the switching brake B0. The vertical line Y7 represents the rotation speed of the seventh rotary element RE7 connected to the output shaft 22.

Figure 4:
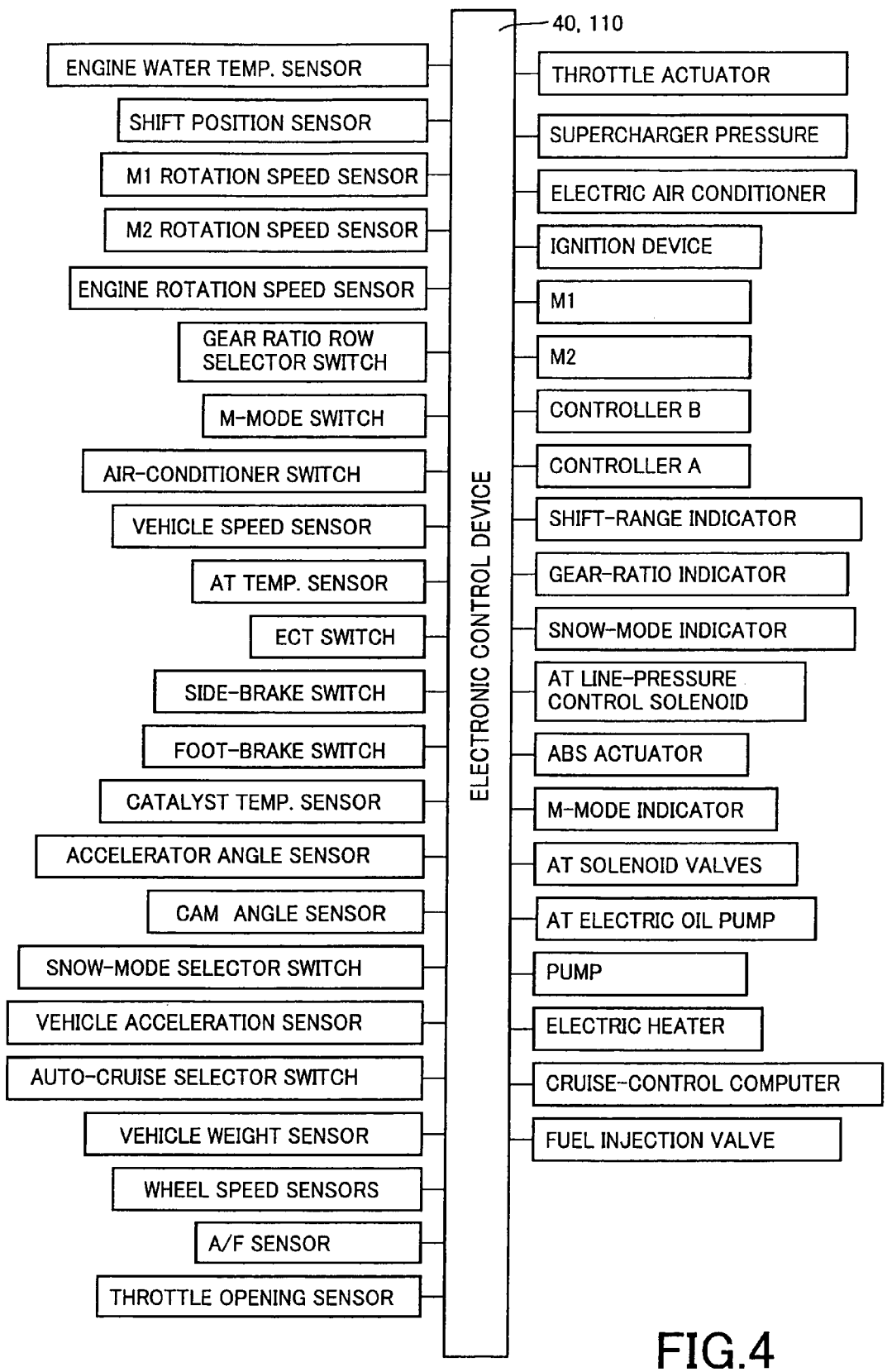
FIG. 4 is a view illustrating input and output signals to be input to or output from an electronic control device incorporated in the hybrid vehicle drive apparatus shown in FIG. 1.

FIG. 4 exemplarily shows an electronic control device 40, serving as a control device for controlling the shifting mechanism 10 forming part of the hybrid vehicle drive system according to the present invention, which is applied with various input signals while providing various output signals. The electronic control device 40 takes the form of a structure including a so-called microcomputer composed of a CPU, a ROM, a RAM and an input/output interface. With the microcomputer performing signal processing in accordance with programs preliminarily stored in the ROM while utilizing a temporary data storage function of the ROM, hybrid drive controls are executed to control the engine 8 and the first and second electric motors M1 and M2, while executing drive controls to cause the automatic shifting portion 20 to perform a shifting control or the like.

The electronic control device 40 is connected to various sensors and switches as shown in FIG. 4 to receive various input signals therefrom. These input signals include: a signal indicative of an engine coolant temperature $TEMP_W$; a signal indicative of a selected shift position $P_{SH}$; a signal indicative of a rotation speed $N_{M1}$ (hereinafter, referred to as a "first-motor rotation speed $N_{M1}$") of the first electric motor M1; a signal indicative of a rotation speed $N_{M2}$ (hereinafter, referred to as a "second-motor rotation speed $N_{M2}$") of the second electric motor M2; a signal indicative of the engine rotation speed $N_E$ representing the rotation speed of the engine 8; a signal indicative of a gear ratio preset value; a signal commanding an "M" mode (manually shift drive mode); an air-conditioning signal indicative of an air conditioner remaining under operation; and a signal indicative of a vehicle speed V corresponding to the rotation speed $N_{OUT}$ of the output shaft 22.

Besides the input signals described above, the electronic control device 40 is further applied with additional various input signals. These additional input signals include: a working oil temperature signal indicative of a working oil temperature $TEMP_{OIL}$ of the automatic shifting portion 20; a signal indicative of a side brake being operated; a signal indicative of a foot brake being operated; a catalyst temperature signal indicative of a catalyst temperature; an accel-opening signal indicative of a displacement value $A_{CC}$ of an accelerator pedal corresponding to an output demand value required by a driver; a cam angle signal; a snow mode preset signal indicative of a snow mode being set; an acceleration signal indicative of a fore and aft acceleration of the vehicle; an auto-cruising signal indicative of the vehicle running under an auto-cruising mode; a vehicle weight signal indicative of a weight of the vehicle; a drive wheel velocity signal indicative of a wheel velocity of each drive wheel; and a signal indicative of an air-fuel ratio A/F of the engine 8, etc.

The electronic control device 40 outputs various control signals including: a control signal applied to an engine output control device 43 (see FIG. 7) for controlling an engine output, i.e., a drive signal applied to a throttle actuator 97 for controlling an opening degree $\theta_{TH}$ of an electronic throttle valve 96 mounted on, for instance, an intake manifold 95 of the engine 8; a fuel supply quantity signal applied to a fuel injection device 98 for controlling the amount to fuel to be supplied to each cylinder of the engine 8; an ignition signal applied to an ignition device 99 for commanding an ignition timing of the engine 8; a supercharger pressure regulating signal for regulating a supercharger pressure level; an electric air-conditioner drive signal for actuating an electric air conditioner; command signals for commanding the first and second electric motors M1 and M2 to operate; and a shift position (selected shift position) display signal for activating a shift indicator, etc.

Besides the control signals described above, the electronic control device 40 generates other output signals including: a gear-ratio display signal for providing a display of a selected gear ratio; a snow-mode display signal for providing a display of the presence of a snow mode under operation; an ABS actuation signal for actuating an ABS actuator so as to preclude the drive wheels from slipping during a braking mode; an M-mode display signal for displaying the M-mode being selected; valve command signals for actuating electromagnet valves incorporated in a hydraulically operated control circuit 42 (see FIG. 7) to control hydraulic actuators of the hydraulically operated friction engaging devices incorporated in the differential portion 11 and the automatic shifting portion 20; a drive command signal for actuating an oil pump 46 serving as a hydraulic pressure source of the hydraulically operated control circuit 42; a signal for driving an electric heater; and a signal applied to a cruise-control computer, etc.

Figure 5:
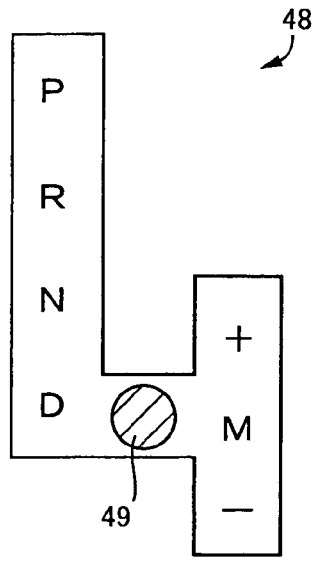
FIG. 5 is a view showing one sample of a shift operating device provided with a shift lever for operating to select one of plural kinds of shift positions.

FIG. 5 is a view showing one sample of a shift operating device 48, serving as a switching device, which is manually operated to select one of the shift positions $P_{SH}$ of multiple kinds. The shift operating device 48 includes a shift lever 49 mounted aside, for example, a driver's seat to be manually operated to select one of the gear shift positions of the plural kinds.

The shift lever 49 is arranged to be manually shifted to: a parking position "P" (Parking) under which the shifting mechanism 10, i.e., the automatic shifting portion 20, is placed in the neutral state interrupting the power transmitting path of the shifting mechanism 10, i.e., the automatic shifting portion 20; a reverse drive running position "R" (Reverse) for the vehicle to run in a reverse drive mode; a neutral position "N" (Neutral) for the neutral state to be established under which the power transmitting path of the shifting mechanism 10 is interrupted; a forward drive automatic shift position "D" (Drive); or a forward drive manual shift position "M" (Manual).

Among these, the parking position "P" represents a position placed in an unattached state, i.e., a neutral state under which the shifting mechanism 10, i.e., the power transmitting path of the automatic shifting portion 20 is interrupted with the output shaft 22 of the automatic shifting portion 20 being locked. The neutral position "N" represents a position placed in a neutral position for the power transmitting path of the shifting mechanism 10 to be interrupted. The forward drive automatic shift position "D" represents a position for the automatic shifting portion 20 to perform an automatic shift control within a varying range of the variable total speed ratio γT. The forward drive manual shift position "M" represents a position for a manual shift mode (manual mode) to be established for setting a so-called shift range in which a gear shift position on a high speed range is limited in the automatic shifting control.

In conjunction with the manual operation of the shift lever 49 for selecting each of the shift positions $P_{SH}$, for instance, the hydraulic control circuit 42 is electrically switched so as to establish each of the gear shift positions such as the reverse drive position "R", the neutral position "N" and the forward drive position "D" in a manner as shown in the engagement operation table shown in FIG. 2.

Among the shift positions $P_{SH}$ covering the positions "P" to "M", the positions "P" and "N" represent non-drive positions selected when no attempt is made to drive the vehicle. The positions "P" and "N" represent the non-drive positions for causing the first and second clutches C1 and C2 to selectively switch the power transmitting path to the power interrupting state under which as shown in, for example, the engagement operation table of FIG. 2, both the first and second clutches C1 and C2 are disengaged to allow the power transmitting path of the automatic shifting portion 20 to be interrupted for disabling the drive of the vehicle.

The positions "R", "D" and "M" represent drive positions selected when an attempt is made to drive the vehicle. These shift positions represent the drive positions selected when causing the first and second clutches C1 and C2 to switch the power transmitting path to the power transmitting state. Under such a state, at least one of the first and second clutches C1 and C2 is engaged as shown in, for instance, the engagement operation table of FIG. 2, thereby connecting the power transmitting path of the automatic shifting portion 20 for enabling the vehicle to be driven.

More particularly, with the shift lever 49 manually shifted from the position "P" or the position "N" to the position "R", the second clutch C2 is engaged so that the power transmitting path of the automatic shifting portion 20 is switched from the power interrupting state to the power transmitting state. With the shift lever 49 manually shifted from the position "N" to the position "D", at least the first clutch C1 is engaged. This causes the power transmitting path of the automatic shifting portion 20 to be switched from the power interrupting state to the power transmitting state.

With the shift lever 49 manually shifted from the position "R" to the position "P" or the position "N", the second clutch C2 is disengaged, causing the power transmitting path of the automatic shifting portion 20 to be switched from the power transmitting state to the power interrupting state. With the shift lever 49 manually shifted from the position "D" to the position "N", the first and second clutches C1 and C2 are disengaged, causing the power transmitting path of the automatic shifting portion 20 to be switched from the power transmitting state to the power interrupting state.

Figure 6:
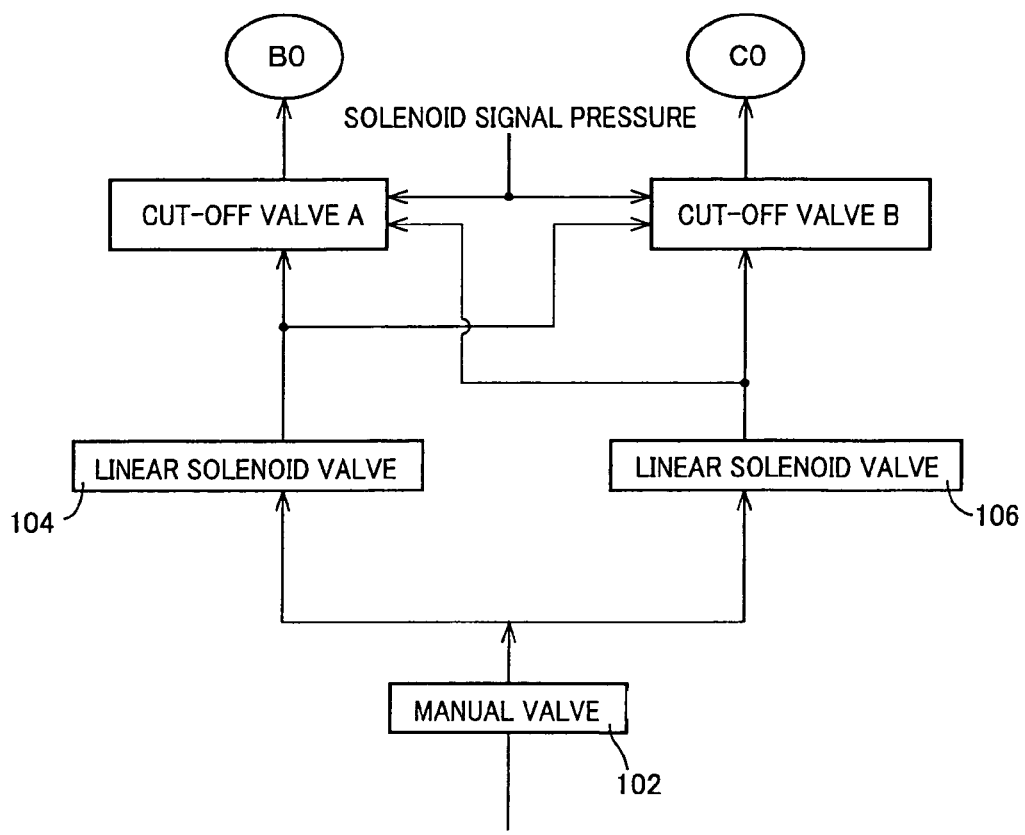
FIG. 6 is a conceptual view of a hydraulic circuit for operating a switching brake B0 and a switching clutch C0 incorporated in a differential portion of the vehicular hybrid vehicle drive apparatus shown in FIG. 1.

FIG. 6 is a conceptual view of a hydraulic control circuit for actuating the switching clutch C0 and the switching brake B0. The hydraulic pressure, delivered from the oil pump 46, is supplied to linear solenoid valves 104 and 106 connected in parallel to each other via a manual valve 102 that is fundamentally movable in conjunction with the operation of the shift lever 49. The linear solenoid valve 104 is connected to the switching brake B0 via a cut-off valve A and the linear solenoid valve 106 is connected to the switching clutch C0 via a cutoff valve B.

With the hydraulic control circuit configured in such a structure, actuating the linear solenoid valve 104 enables the switching brake B0 to be controllably engaged and actuating the linear solenoid valve 106 enables the switching clutch C0 to be controllably engaged. The linear solenoid valve 106 generates an output pressure to actuate the cutoff valve A, thereby blocking the supply of hydraulic pressure to the switching brake B0. Likewise, the linear solenoid valve 104 generates another output pressure to actuate the cutoff valve B, thereby blocking the supply of hydraulic pressure to the switching clutch C0. Therefore, no situation takes place for the switching brake B0 and the switching clutch C0 to be simultaneously engaged.

Further, although the output pressures, generated by the linear solenoid valves 104 and 106, are supplied as signal pressures for actuating the cutoff valves A and B, no need arises to use such output pressures. That is, an attempt may be made to separately provide other solenoid valves for actuating the cutoff valves A and B to allow these solenoid valves to provide solenoid signal pressures for controlling the cutoff valves A and B, respectively.

FIG. 7 is a functional block diagram illustrating a major part of a control function to be executed with the electronic control device 40. The electronic control device 40 includes switching control means 50, hybrid control means 52, step-variable shift control means 54, memory means 56, increasing-speed gear position determining means 62, engine start-up determining means 70, abnormal noise determining means 72, hydraulic pressure supply means 74, power transmitting path switching means 76, differential state switching means 78 and engine start-up means 80, etc.

Figure 8:
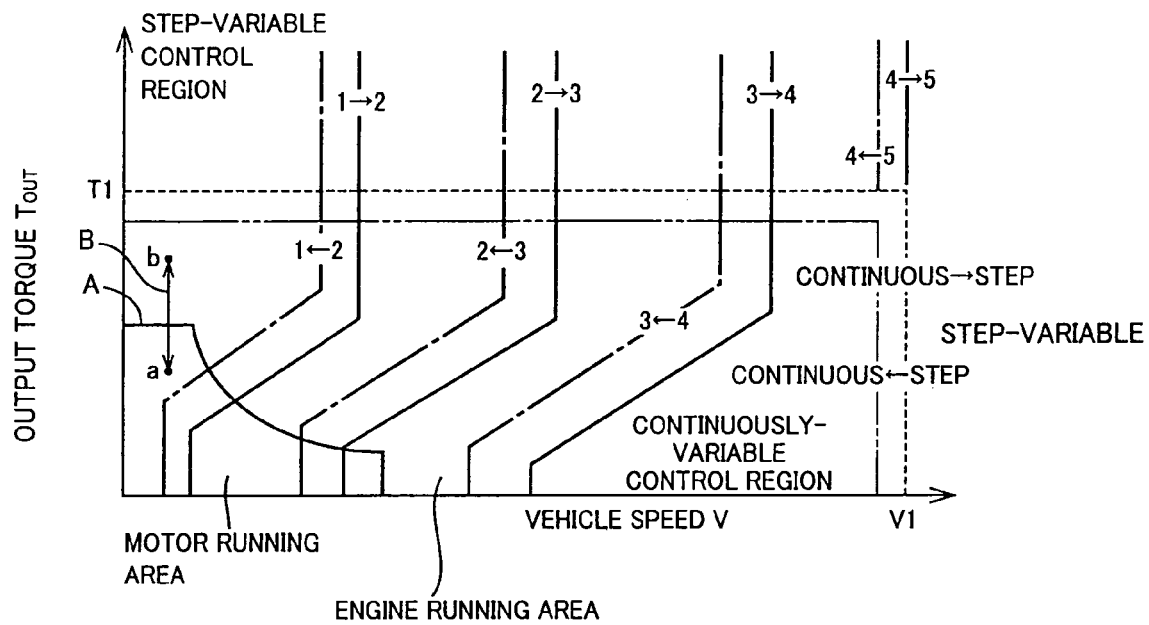
FIG. 8 is a view representing one example of a preliminarily stored shifting diagram, plotted on a two-dimensional coordinate in terms of parameters including a vehicle speed and output torque, based on which the operation is executed whether to execute a shifting in an automatic shifting portion. It also represents one example of a preliminarily stored drive-force source switching diagram having a boundary line between an engine drive region and a motor drive region based on which an engine drive mode and a motor drive mode is switched. Relation between the both diagrams is further represented.

In FIG. 7, the step-variable shift control means 54 functions as shift control means for causing the automatic shifting portion 20 to execute the shifting. For instance, the step-variable shift control means 54 discriminates whether to execute the shifting in the automatic shifting portion 20 on the basis of a vehicle condition represented by the vehicle speed V and demanded output torque $T_{OUT}$ of the automatic shifting portion 20. This determination is made by referring to the relationship (including the shifting diagram and the shifting map), preliminarily stored in the memory means 56, which is plotted in solid lines and single dot lines as shown in FIG. 8. That is, the step-variable shift control means 54 discriminates a gear shift position to be selected in the automatic shifting portion 20, thereby causing the automatic shifting portion 20 to execute the shifting so as to obtain the discriminated gear shift position. When this takes place, the step-variable shift control means 54 outputs a command (gear shift output command) to the hydraulic control circuit 42 for engaging and/or disengaging the hydraulically operated friction engaging devices, excepting the switching clutch C0 and the switching brake B0, so as to achieve a desired gear shift position in accordance with, for instance, the engagement operation table shown in FIG. 2.

Hybrid control means 52 renders the engine 8 operative in an operating region with increased efficiency under the continuously variable shifting state of the shifting mechanism 10, i.e., under the differential state of the differential portion 11. At the same time, the hybrid control means 52 causes the engine 8 and the second electric motor M2 to deliver drive forces at varying distributing rates and causes the first electric motor M1 to generate electric power at a varying rate so as to provide an optimum reactive force. This allows the differential portion 11 to act as the electrically controlled continuously variable transmission to provide a speed ratio γ0 at a controlled rate.

During the running of the vehicle at a current vehicle speed, for instance, the hybrid control means 52 calculates a target (demanded) output, required for the vehicle, by referring to the displacement value Acc of the accelerator pedal, representing the output demanded value intended by the driver, and the vehicle speed V. Then, the hybrid control means 52 further calculates a demanded total target output based on the target output, required for the vehicle, and a charging request value. In order to obtain such a total target output, the hybrid control means 52 calculates a target engine output in consideration of a transmission loss, loads of auxiliary units and assisting torque required for the second electric motor M2, etc. Then, the hybrid control means 52 controls the engine 8 so as to provide the engine rotation speed $N_E$ and engine torque $T_E$ such that the target engine output is obtained, while controlling the first electric motor M1 so as to generate electric power at a controlled power rate.

The hybrid control means 52 executes such a hybrid control in consideration of the gear position achieved in the automatic shifting portion 20 so as to obtain power performance and improved fuel consumption. During such a hybrid control, the differential portion 11 is rendered operative to function as the electrically controlled continuously variable transmission. This allows the engine rotation speed $N_E$, determined for the engine 8 to operate at high efficiency, to match the rotation speed of the power transmitting member 18 determined based on the vehicle speed V and the gear position selected in the automatic shifting portion 20.

That is, the hybrid control means 52 preliminarily stores therein an optimum fuel economy curve (including a fuel economy map and related relationship) of the engine 8. The optimum fuel economy curve is determined on preliminarily experimental tests so as to have a compromise between drivability and fuel economy performance during the running of the vehicle under the continuously variable shifting state on a two-dimensional coordinate with parameters including, for instance, the engine rotation speed $N_E$ and output torque (engine torque) $T_E$ of the engine 8. A target value on the total speed ratio $\gamma T$ of the shifting mechanism 10 is determined so as to cause the engine 8 to operate on such an optimum fuel economy curve.

For the engine 8 to operate on the optimum fuel economy curve, the target value is determined to obtain engine torque $T_E$ and the engine rotation speed $N_E$ for generating the demanded engine output so as to satisfy, for instance, the target output (total target output and demanded drive force). The hybrid control means 52 allows such a target value to be obtained upon controlling the differential portion 11 so as to provide a controlled speed ratio $\gamma 0$. This allows the total speed ratio $\gamma T$ to be controlled within a variable shifting range at a value ranging from, for instance, 13 to 0.5.

During such a hybrid control, the hybrid control means 52 allows electric energy, generated by the first electric motor M1, to be supplied to a battery 60 and the second electric motor M2 through an inverter 58. Thus, a major part of the drive force, delivered from the engine 8, is mechanically transmitted to the power transmitting member 18. In this case, a part of the drive force, delivered from the engine, is transferred to the first electric motor M1 to be consumed for conversion to electric energy. The resulting electric energy is supplied through an inverter 58 to the second electric motor M2, which in turn is driven to provide a drive force for delivery to the power transmitting member 18. Equipments, involved in generating electric energy and causing the second electric motor M2 to consume electric energy, establish an electric path through which the part of the drive force, delivered from the engine 8, is converted to electric energy which in turn is converted into mechanical energy.

The hybrid control means 52 functionally includes engine output control means. More particularly, the engine output control means actuates the throttle actuator 97 for controllably opening or closing an electronic throttle valve 96 so as to perform a throttle control. In addition, the engine output control means outputs commands singly or in combination to the engine output control device 43. This causes the fuel injection device 98 to control a fuel injection quantity and fuel injection timing for performing a fuel injection control while permitting the ignition device 99, such as an igniter or the like, to control an ignition timing for an ignition timing control. For instance, the hybrid control means 52 drives the throttle actuator 97 in response to the acceleration opening signal Acc by basically referring to the preliminarily stored relationship, not shown, so as to execute the throttle control such that the greater the accelerator opening Acc, the greater will be the throttle valve opening $\theta_{TH}$.

A solid line A, shown in FIG. 8, represents a boundary line between an engine drive region and a motor drive region based on which the engine 8 and an electric motor, i.e., for instance, the second electric motor M2 are selectively switched to act as a drive-force source for starting up and/or running (hereinafter collectively referred to as "running") the vehicle. In other words, the boundary line is used for performing the switching between a so-called engine drive mode, in which the engine 8 is caused to act as a running drive-force source for starting up/running (hereinafter collectively referred to as "running") the vehicle, and a so-called motor drive mode in which the second electric motor M2 is caused to act as another drive-force source for running the vehicle.

The preliminarily stored relationship, having the boundary line (in the solid line A) shown in FIG. 8 for the engine drive region and the motor drive region to be switched, represents one example of a drive-force source switching diagram (drive-force source map), formed on a two-dimensional coordinate, which includes parameters such as the vehicle speed V and output torque $T_{OUT}$ representing a drive-force related value. The memory means 56 preliminarily stores such a drive-force source switching diagram together with the shifting diagram (shifting map) designated by, for instance, the solid line and the single dot line in FIG. 8.

The hybrid control means 52 executes the operation based on the vehicle condition, represented by the vehicle speed V and demanded torque output $T_{OUT}$ by referring to, for instance, the drive-force source switching diagram shown in FIG. 8 to determine which of the motor drive region and the engine drive region is to be selected, thereby executing the motor drive mode or the engine drive mode. Thus, the hybrid control means 52 executes the motor drive mode at relatively low output torque $T_{OUT}$, i.e., at low engine torque $T_E$ with engine efficiency generally regarded to be lower than that of a high torque region, or at a relatively low vehicle speed range of the vehicle speed V, i.e., under a low load region as will be apparent from FIG. 8.

During such a motor drive mode, the hybrid control means 52 renders the differential portion 11 operative to perform an electrically controlled CVT function (differential action) for controlling the first-motor rotation speed $N_{M1}$ at a negative rotation speed, i.e., at an idling speed. This allows the differential portion 11 to perform the differential action so as to maintain the engine rotation speed $N_E$ at a zeroed or nearly zeroed level. This minimizes a drag of the engine 8, remained under a halted state, for providing improved fuel economy.

The hybrid control means 52 includes engine start-up and stop control means 66 operative to switch the operating state of the engine 8 between a drive state and a stop state to select one of the engine drive mode and the motor drive mode. With the hybrid control means 52 executed the operation based on the vehicle condition by referring to, for instance, the drive-force source switching diagram shown in FIG. 7 to determine that the motor drive mode and the engine drive mode need to be switched, the engine start-up and stop control means 66 executes the operation to start-up or stop the engine 8.

If the accelerator pedal is depressed in operation to increase demanded engine output torque $T_{OUT}$, the vehicle condition varies from the motor drive region to the engine drive region as shown by a transition in points "a"→"b" on a solid line B in FIG. 8. When this takes place, the engine start-up and stop control means 66 turns on the first electric motor M1 to raise the first-motor rotation speed $N_{M1}$. That is, the first electric motor M1 is rendered operative to function as a starter. This allows the engine 8 to start-up upon increasing the engine rotation speed $N_E$ so as to allow the ignition device 99 to initiate an ignition at a given engine rotation speed $N_E'$, i.e., for instance, at an engine rotation speed $N_E$ enabling an autonomous rotation. Thus, the hybrid control means 52 switches the drive mode from the motor drive mode to the engine drive mode.

During such operation, the engine start-up and stop control means 66 may cause the first-motor rotation speed $N_{M1}$ to rapidly increase for thereby causing the engine rotation speed $N_E$ to immediately increase up to the given engine rotation speed $N_E'$. This can immediately avoid the occurrence of a resonating region in an engine rotating speed region less than a well-known idling rotation speed $N_{IDLE}$, thereby suppressing the possibility of the engine 8 vibrating on a start-up stage thereof.

If the accelerator pedal is released with a decrease in demanded engine output torque $T_{OUT}$, the vehicle condition varies from the engine drive region to the motor drive region as shown by another transition in points "b"→"a" on the solid line B in FIG. 7. When this takes place, the engine start-up and stop control means 66 causes the fuel injection device 98 to interrupt the supply of fuel to the engine 8. That is, a fuel cut-off operation is initiated to stop the engine 8 that is the engine 8 is stopped. In such a way, the hybrid control means 52 switches the engine drive mode to the motor drive mode.

During such an operation, the engine start-up and stop control means 66 may execute the operation to immediately lower the first-motor rotation speed $N_{M1}$ for immediately lowering the engine rotation speed $N_E$ to a zeroed or nearly zeroed level. This immediately avoids the engine 8 from suffering the resonating region, thereby suppressing the possibility of the engine 8 vibrating at start-up thereof. In an alternative, the engine start-up and stop control means 66 may stop the operation of the engine 8 upon decreasing the first-motor rotation speed $N_{M1}$ to lower the engine rotation speed $N_E$ on a stage prior to the fuel cutoff operation being executed such that the fuel cutoff operation is initiated at the given engine rotation speed $N_E'$.

Even if the engine drive region is present, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and the motor drive mode in combination.

The hybrid control means 52 renders the differential portion 11 operative to perform the electrically controlled CVT function to sustain the operating state of the engine 8 regardless of the vehicle left in a halted condition or under a low speed condition. For instance, if a drop occurs in a state of charge SOC of the battery 60 during the halt of the vehicle with a need occurring on the first electric motor M1 to generate electric power, the first electric motor M1 is driven with the drive force, delivered from the engine 8, to generate electric power with an increase in the rotation speed. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 52 executes the operation to cause the differential portion 11 to perform the electrically controlled CVT function for controlling the first-motor rotation speed $N_{M1}$ and the second-motor rotation speed $N_{M2}$ to maintain the engine rotation speed $N_E$ at an arbitrary level regardless of the vehicle remaining under the halted or running state. As will be understood from, for instance, the collinear chart shown in FIG. 3, for the engine rotation speed $N_E$ to be raised, the hybrid control means 52 executes the operation to maintain the second-motor rotation speed $N_{M2}$, bound with the vehicle speed V, at a nearly fixed level while raising the first-motor rotation speed $N_{M1}$.

The increasing-speed gear-position determining means 62 executes the operation in accordance with, for instance, the shifting diagram, shown in FIG. 8, which is preliminarily stored in the memory means 56 based on the vehicle condition to determine whether or not a gear position to be shifted in the shifting mechanism 10 belongs to an increasing-speed gear position, i.e., for instance, a 5th-speed gear position. This is necessary for determining which one of the switching clutch C0 and the switching brake B0 should be applied to place the shifting mechanism 10 in the step variable shifting state.

The switching control means 50 switches engaging and disengaging states of the differential-state switching means (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$, by referring to the relationship (shifting diagram and shifting map) preliminarily stored in the memory means 56 and shown in the broken line and the double dot line in FIG. 8. Thus, the determination is made whether to switch the shifting state of the shifting mechanism 10 (differential portion 11).

That is, the operation is executed to determine whether there exist a continuously variable shifting control region for the shifting mechanism 10 to be placed in the continuously variable shifting state or a step-variable shifting control region for the shifting mechanism 10 to be placed in the step-variable shifting state. Thus, the shifting state to be switched in the shifting mechanism 10 is determined, upon which the shifting state is selectively switched to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disabling or interrupting the hybrid control or the continuously variable shifting control. Also, another signal is output to the step-variable shift control means 54, which is consequently permitted to perform the shifting for the step-variable shifting operation that has been preliminarily determined. In this moment, the step-variable shift control means 54 allows the automatic shifting portion 20 to perform the automatic shifting in accordance with, for instance, the shifting diagram shown in FIG. 8 and preliminarily stored in the memory means 56. For instance, the engagement operation table, shown in FIG. 2 and preliminarily stored in the memory means 56, represents combined operations of the hydraulically operated friction engaging devices, such as the clutches C0, C1 and C2 and the brakes B0, B1, B2 and B3, which are selected in such a shifting operation. That is, a whole of the shifting mechanism 10, i.e., the differential portion 11 and the automatic shifting portion 20, functions as a so-called step-variable automatic transmission, thereby establishing a selected gear position in accordance with the engagement operation table shown in FIG. 2.

For instance, if the increasing-speed gear-position determining means 62 determines that the 5th-speed gear position is to be selected, the switching control means 50 outputs a command to the hydraulic control circuit 42 for disengaging the switching clutch C0 while engaging the switching brake B0 such that the differential portion 11 is caused to function as a subsidiary power transmission with a fixed speed ratio $\gamma 0$, i.e., the speed ratio y0 having a value equal to, for instance, "0.7". This is achieved for a whole of the shifting mechanism 10 to obtain a so-called overdrive-gear position on an increasing-speed gear position to provide a speed ratio less than "1.0".

If the increasing-speed gear-position determining means 62 determines that no 5th-speed gear position is to be selected, then, the switching control means 50 outputs another command to the hydraulic control circuit 42 for engaging the switching clutch C0 while disengaging the switching brake B0 such that the differential portion 11 is caused to function as the subsidiary power transmission providing the fixed speed ratio $\gamma 0$, i.e., the speed ratio $\gamma 0$ equal to, for instance, "1". This is achieved for a whole of the shifting mechanism 10 to obtain a decreasing-speed gear position with a speed ratio of "1.0" or more.

Thus, the switching control means 50 causes the shifting mechanism 10 to be switched in the step-variable shifting state under which the gear positions of two kinds are selectively switched to establish either one of the gear positions such that the differential portion 11 is rendered operative to function as the subsidiary power transmission. Meanwhile, the automatic shifting portion 20, connected to the differential portion 11 in series, is rendered operative to function as the step-variable transmission. This allows a whole of the shifting mechanism 10 to be rendered operative to function as the so-called step-variable automatic transmission.

On the contrary, if the switching control means 50 determines that the shifting mechanism 10 remains in the continuously variable shifting control region to be switched to the continuously variable shifting state, then, the switching control means 50 outputs a command to the hydraulic control circuit 42 for disengaging both the switching clutch C0 and the switching brake B0. This causes the differential portion 11 to be placed in the continuously variable shifting state to enable a continuously variable shifting operation to be executed such that a whole of the shifting mechanism 10 can obtain the continuously variable shifting state. Simultaneously, the switching control means 50 outputs another signal to the hybrid control means 52 for permitting the hybrid control to be executed while outputting a signal to the step-variable shift control means 54 for the gear position to be fixed for the continuously variable shifting state that has been preliminarily determined. In addition, the switching control means 50 may be configured to output a signal to the step-variable shift control means 54 for permitting the automatic shifting portion 20 to perform the automatic shifting operation in accordance with, for instance, the shifting diagram, shown in FIG. 8, which is preliminarily stored in the memory means 56.

In this case, the step-variable shift control means 54 performs the automatic shifting upon executing the operation except for the operations related to the engagement of the switching clutch C0 and the switching brake B0 in the engagement operation table shown in FIG. 2. Thus, the switching control means 50 allows the differential portion 11 to function as the continuously variable transmission placed in the continuously variable shifting state, while causing the automatic shifting portion 20, connected to the differential portion 11 in series, to function as the step-variable transmission. This allows a drive force to be obtained with an appropriate magnitude.

At the same time, the rotation speed input to the automatic shifting portion 20, i.e., the rotation speed of the power transmitting member 18, is continuously varied to establish each gear position in a continuously variable speed ratio for each of the 1st-speed, 2nd-speed, 3rd-speed and 4th-speed gear positions of the automatic shifting portion 20. Accordingly, the shifting mechanism 10 provides a transition between the adjacent gear positions at a speed ratio varying in a continuously variable state, thereby causing a whole of the shifting mechanism 10 to be placed in the continuously variable shifting state to obtain the overall speed ratio $\gamma T$ in a continuously variable range.

Now, the relationship (shifting diagram and shifting map), preliminarily stored in the memory means 56, based on which the shifting of the automatic shifting portion 20 is determined, will be described below in detail with reference to FIG. 8. FIG. 8 represents one example of the shifting diagram plotted on a two-dimensional coordinate with the parameters such as the vehicle speed V and demanded output torque $T_{OUT}$ indicative of the drive-force related value. In FIG. 8, solid lines represent upshift lines and single dot lines represent downshift lines.

In FIG. 8, broken lines represent a determining vehicle speed V1 and a determining output torque T1 for the switching control means 50 to determine whether or not the shifting mechanism 10 is present in either one of the step-variable control region and the continuously variable control region. That is, the broken lines, shown in FIG. 8, represent a high vehicle-speed determining line, forming a series of the determining vehicle speed V1 indicative of a predetermined high-speed drive determining line for determining whether a hybrid vehicle lies in a high speed running state, and a high-output drive determining line, forming a series of determining output torque T1 indicative of a predetermined high-output drive determining line for determining a drive-force related value related to the drive force of the hybrid vehicle.

As indicated by a double dot line in contrast to the broken line in FIG. 8, there is a hysteresis provided for determining the step-variable control region and the continuously variable control region. That is, FIG. 8 represents a switching diagram (switching map and relationship) preliminarily stored for the switching control means 50 to execute the operation based on the parameters, such as the vehicle speed V and output torque $T_{OUT}$, which include the determining vehicle speed V1 and determining output torque T1. This allows the determination to be made on a region as to which of the step-variable control region and the continuously variable control region belongs to the shifting mechanism 10.

The memory means 56 may be arranged to preliminarily store the shifting map, inclusive of such a switching diagram. Moreover, the switching diagram may be of the type that includes at least one of the determining vehicle speed V1 and determining output torque T1 and may include a preliminarily stored switching line with a parameter taking any of the vehicle speed V and output torque $T_{OUT}$.

The shifting diagram, the switching diagram or the drive-force source switching diagram or the like may be stored not in the maps but in determining formulae for making comparison between an actual current vehicle speed V and a determining vehicle speed V1, and another determining formulae or the like for making comparison between output torque $T_{OUT}$ and determining output torque T1. In this case, the switching control means 50 places the shifting mechanism 10 in the step-variable shifting state when the vehicle condition such as, for instance, an actual vehicle speed exceeds the determining vehicle speed V1. In addition, the switching control means 50 places the shifting mechanism 10 in the step-variable shifting state when the vehicle condition such as, for instance, output torque $T_{OUT}$ of the automatic shifting portion 20 exceeds determining output torque T1.

When a malfunction or functional deterioration occurs in electrical control equipment such as an electric motor or the like used for rendering the differential portion 11 operative as the electrically controlled continuously variable transmission, the switching control means 50 may be configured to place the shifting mechanism 10 in the step-variable shifting state on a priority basis for the purpose of ensuring the vehicle to run even if the shifting mechanism 10 remains in the continuously variable control region. As used herein, the term "malfunction or functional deterioration in electrical control equipment" refers to a vehicle condition in which: a functional degradation occurs in equipment related to the electrical path involved in operating the first electric motor M1 to generate electric energy and in converting such electric energy to mechanical energy; that is, a failure or a functional deterioration, caused by a breakdown or low temperature, occurs in the first electric motor M1, the second electric motor M2, the inverter 58, the battery 60 and a transmission path interconnecting these component parts.

As used herein, the term "drive-force related value", described above, may refer not only a parameter corresponding to the drive force, required for the vehicle in one-to-one relation, in the form of drive torque or drive force acting on the drive wheels 38 but also other parameters. Example of the other parameters may include, for instance: output torque $T_{OUT}$ of the automatic shifting portion 20; engine output torque $T_E$; a vehicle acceleration value; an actual value such as engine output torque $T_E$ calculated based on, for instance, the accel-operating or the throttle valve opening $\theta_{TH}$ (or an intake air quantity, an air/fuel ratio or a fuel injection amount) and the engine rotation speed $N_E$; demanded (target) engine torque $T_E$ calculated based on a displacement value of the accelerator pedal actuated by the driver or the throttle valve opening or the like; an estimated value such as demanded (target) output torque $T_{OUT}$ required for the automatic shifting portion 20; or a demanded drive force or the like. In addition, drive torque may be calculated in consideration of a differential ratio and a radius of each drive wheel 38 by referring to output torque $T_{OUT}$ or the like or may be directly detected using, for instance, a torque sensor or the like. The other torques, mentioned above, may be similarly obtained.

For instance, the determining vehicle speed V1 is determined to have a value such that the shifting mechanism 10 is placed in the step-variable shifting state during the running of the vehicle at a high speed. This prevents the occurrence of deteriorated fuel consumption that would otherwise occur if the shifting mechanism 10 would be placed in the step-variable shifting state during the running of the vehicle at the high speed. Further, determining torque T1 is determined to have a value depending on a characteristic of the first electric motor M1 which is configured not to cause reactive torque of the first electric motor M1 to cover a high output region of the engine during the running of the vehicle at a high output but to generate electric energy at a reduced maximum power rate for the first electric motor M1 to be miniaturized in structure.

Figure 9:
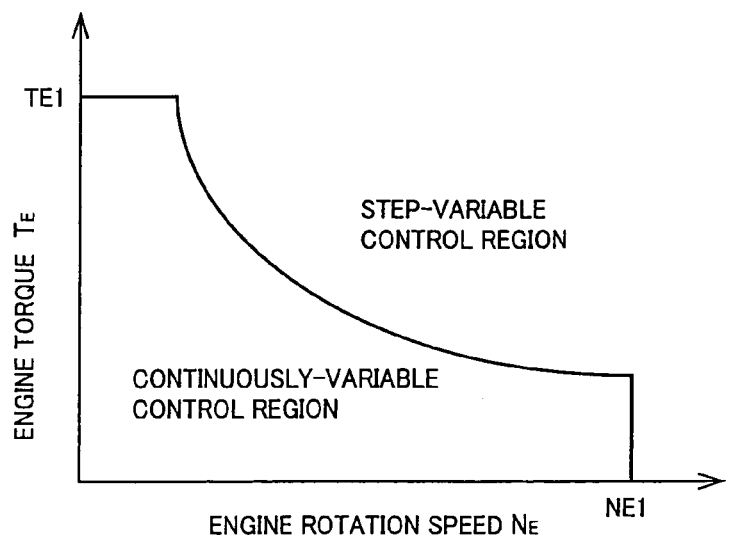
FIG. 9 is a conceptual view showing the preliminarily stored relationship, involving a boundary line between a continuously variable control region and a step-variable control region, which is suitable for mapping a boundary between the continuously variable control region and the step-variable control region shown in broken lines in FIG. 8.

FIG. 9 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed $N_E$ and engine torque $T_E$. The switching control means 50 may execute the operation based on the engine rotation speed $N_E$ and engine torque $T_E$ by referring to the switching diagram shown in FIG. 9 in place of the switching diagram shown in FIG. 8. FIG. 9 is a conceptual view for preparing the broken line in FIG. 8. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated by the relationship shown in FIG. 8, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

As indicated by the relationship shown in FIG. 9, similarly, the step-variable control region is set to lie in a high-torque region with engine torque $T_E$ exceeding a predetermined given value TE1, a high-speed rotating region with the engine rotation speed $N_E$ exceeding a predetermined given value NE1, or a high output region where the engine output calculated, based on engine torque $T_E$ and the engine rotation speed $N_E$, is greater than a given value. Therefore, the step-variable shift drive mode is effectuated at relatively high torque, relatively high rotation speed or relatively high output of the engine 8. A continuously variable shift drive mode is effectuated at relatively low torque, relatively low rotation speed or relatively low output of the engine 8, i.e., in the commonly used output region of the engine 8. The boundary line, shown in FIG. 9, between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the running of the vehicle at a low/medium speed and low/medium output, the shifting mechanism 10 is placed in the continuously variable shifting state to ensure the vehicle to have improved fuel economy performance. During the running of the vehicle at a high speed with an actual vehicle speed V exceeding the determining vehicle speed V1, the shifting mechanism 10 is placed in the step-variable shifting state. This allows the shifting mechanism 10 to act as the step-variable transmission so that the output of the engine 8 is transferred to the drive wheels 38 mainly through a mechanical power transmitting path. This suppresses a loss in conversion between the drive force, generated when the shifting mechanism 10 is caused to act as the electrically controlled continuously variable transmission, and electric energy, providing improved fuel consumption.

During the running of the vehicle on the high output drive mode with the drive-force related value such as output torque $T_{OUT}$ or the like exceeding determining torque T1, the shifting mechanism 10 is placed in the step-variable shifting state to act as the step-variable transmission. In this moment, the output of the engine 8 is transferred to the drive wheels 38 mainly through the mechanical power transmitting path to cause the electrically controlled continuously variable transmission to operate in a low/medium speed running region and a low/medium output running region of the vehicle. This results in a reduction in the maximum value of electric energy generated by the first electric motor M1, i.e., electric energy to be transmitted by the first electric motor M1. This enables a further miniaturization of the first electric motor M1 per se or a vehicle drive apparatus including such a component part.

In another viewpoint, further, during the running of the vehicle on such a high output drive mode, the driver places more emphasis on a requirement for the drive force and less emphasis on a requirement for a mileage and, thus, the shifting mechanism 10 is switched to the step-variable shifting state (fixed shifting state) rather than to the continuously variable shifting state. With such a switching operation, the driver can enjoy a fluctuation in the engine rotation speed $N_E$, i.e., a rhythmical variation in the engine rotation speed $N_E$ caused by the upshifting in the step-variable automatic shift running mode.

In such a way, the differential portion 11 (shifting mechanism 10) of the present embodiment can be selectively switched to one of the continuously variable shifting state and the step-variable shifting state (fixed shifting state). The switching control means 50 executes the operation based on the vehicle condition to determine the shifting state to be selected in the differential portion 11, thereby causing the shifting state to be selectively switched to either one of the continuously variable shifting state and the step-variable shifting state.

With the first embodiment, although the hybrid control means 52 can execute the operation based on the vehicle condition to switch the engine drive mode and the motor drive mode, the engine start-up and stop control means 66 is cased to start-up or stop the engine 8 for the purpose of performing the switchover between the engine drive mode and the motor drive mode.

In order to start-up the engine 8, the engine rotation speed $N_E$ needs to be raised to a rotation speed available to start-up the engine 8. In this moment, the power distributing mechanism 16 may generate abnormal noise such as rattling gear noise or the like due to a backlash between gears incorporated in the power distributing mechanism 16 or a fluctuation occurring in rotational resistance of the engine 8. There is a trend in that abnormal noise such as rattling gear noise or the like increases in a resonating region of the engine rotation speed region.

When rotational resistance of the engine 8 increases or where a drop occurs in state of charge (SOC) of the battery 60 with a resultant difficulty of obtaining an adequate battery output, it becomes difficult to raise the engine rotation speed $N_E$ so as to rapidly transit the resonating region. This results in an increase in abnormal noise such as the rattling gear noise or the like, impairing a comfort of a vehicle occupant. To address such an issue, a control is executed for minimizing the occurrence of abnormal noise in the form of rattling gear noise resulting from rattling gear noise described above.

Hereunder, description is made of a control operation to be executed for minimizing the occurrence of abnormal noise in the form of rattling gear noise like rattling gear noise mentioned above.

Turning back to FIG. 7, the engine start-up determining means 70 determines whether or not an engine start-up command is output requesting a start-up of the engine 8 during a halt of a vehicle. When, for instance, an ignition switch is turned on, the engine start-up command is output. Since the engine start-up is initiated that is the engine is started up upon receipt of the engine start-up command, the engine 8 remains halted at time when the engine start-up command is output.

The abnormal noise determining means 72 predicts to determine whether or not a level of rattling gear noise, caused in the power distributing mechanism 16, exceeds a predetermined level that is determined on experimental tests in consideration of whether a comfort of a vehicle occupant is impaired. Such a way of making the determination will be described below in detail. When raising the engine rotation speed $N_E$ with a view to achieving the engine start-up, a situation stands such that the greater the rotational resistance of the engine 8, the longer will be the residence time of the engine 8 in the resonating region with a resultant tendency of an increase in rattling gear noise. In such a case, if engine oil lubricating the engine 8 remains at a low temperature, then, a viscosity of engine oil increases with a resultant increase in rotational resistance of the engine 8.

Therefore, experimental tests have been preliminarily conducted to obtain a correlation between a temperature of the engine 8 and a level of rattling gear noise, thereby determining an engine temperature determining value corresponding to a given value on rattling gear noise in terms of such a correlation. If the temperature of the engine 8 is less than the engine temperature determining value, then, the abnormal noise determining means 72 regards that rattling gear noise is higher than the given value, thereby making the determination as mentioned above. Here, the temperature of the engine 8 is detected with, for instance, an engine coolant temperature sensor to provide an output as an engine coolant temperature signal TEMPw.

If the determination is made that no rattling gear noise exceeds the given value, the abnormal noise determining means 72 permits the engine start-up means 80 to start-up the engine 8 with the power distributing mechanism 16 kept in the differential state. If the temperature of the engine 8 is less than the engine temperature determining value, then, the abnormal noise determining means 72 regards that rattling gear noise is higher than the given value. In an alternative, the abnormal noise determining means 72 may be configured to regard that rattling gear noise is higher than the given value when the state of charge SOC drops below a given value. This is because presence of the drop in the state of charge SOC causes the first electric motor M1 to have a difficulty of providing adequate output torque such that the engine 8 is liable to easily have increased residence time in the resonating region. In another alternative, further, the abnormal noise determining means 72 may be configured to predict on a level of rattling gear noise in terms of parameters including both the temperature of the engine 8 and the state of charge SOC.

If the engine start-up determining means 70 determines that the engine start-up command is output and the abnormal noise determining means 72 makes a positive determination that rattling gear noise exceeds the given value, then, the hydraulic pressure supply means 74 starts up the oil pump 46. During halts of the vehicle and the engine, actuating the oil pump 46 allows a hydraulic pressure to be supplied to the switching clutch C0, the first and second clutches C1 and C2, the switching brake B0 and the first to third brakes B1 to B3, which are consequently made operative.

If the engine start-up determining means 70 determines that the engine start-up command is output and the abnormal noise determining means 72 makes a positive determination that rattling gear noise exceeds the given value, then, the power transmitting path switching means 76 disengages the first and second clutches C1 and C2. This results in a disconnection in the power transmitting path between the differential portion 11 and the automatic shifting portion 20, causing the power transmitting path between the engine 8 or the differential portion 11 and the drive wheels 38 to be placed in the power interrupting state. During the halts of the vehicle and the engine, further, all of the clutches C0 to C2 and the brakes B0 to B3 remain disengaged and the power transmitting path switching means 76 confirms that the first and second clutches C1 and C2 are disengaged.

With the oil pump 46 started up with the first and second clutches C1 and C2 remained disengaged, the differential state switching means 78 executes a C0-lock control for engaging the switching clutch C0. This limits or restricts the relative rotation between the first and second rotary elements RE1 and RE2. During such operation, detecting that a drive command signal is output for actuating, for instance, the oil pump 46 or detecting that an output hydraulic pressure, detected with a hydraulic sensor incorporated in the oil pump 46, exceeds a given value allows a discrimination to be made whether or not the oil pump 46 has been started up.

As the C0-lock control begins to be executed, the differential state switching means 78 confirms completion of the engagement of the switching clutch C0 in the C0-lock control. For instance, the completion in engagement of the switching clutch C0 is detected with a hydraulic pressure switch that is operated based on an engagement pressure of the switching clutch C0. Also, the engagement of the switching clutch C0 causes the differential portion 11 to be placed in a non-differential state or a nearly non-differentials state under which the first to third rotary elements RE1 to RE3 of the power distributing mechanism 16 are caused to unitarily rotate. This leads to a state under which the engine 8 (RE1), the first electric motor M1 (RE2) and the second electric motor M2 (RE3) can be rotatable at an identical speed or a nearly identical speed.

As the C0-lock control is executed to complete the engagement of the switching clutch C0, the engine start-up means 80 controllably drives the first electric motor M1 to increase the related rotation speed $N_{M1}$, thereby increasing the engine rotation speed $N_E$ up to a given rotation speed available to perform the engine start-up. With the engine rotation speed $N_E$ raised to a value beyond the given rotation speed, an engine ignition is initiated to start up the engine 8.

Figure 10:
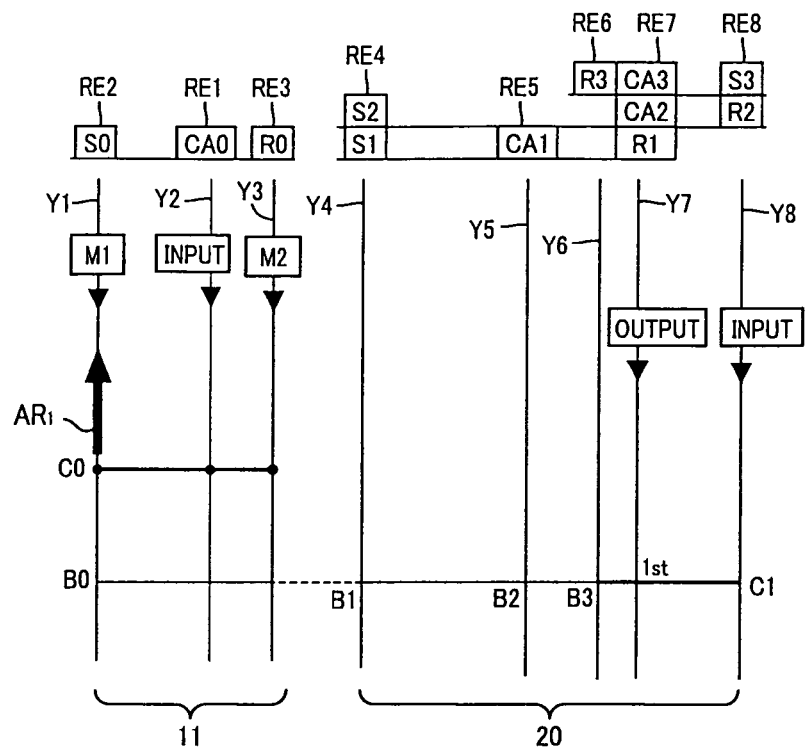
FIG. 10 is a collinear chart for illustrating a relative speed of associated rotary elements in a differential portion occurring when raising an engine rotation speed to start-up an engine upon engaging the switching clutch in the vehicular hybrid vehicle drive apparatus shown in FIG. 1.

The control of such a first-motor rotation speed $N_{M1}$ will be described below with reference to a collinear chart shown in FIG. 10. Executing the C0-lock control allows the power distributing mechanism 16 to be placed in the non-differential state or a nearly non-differential state under which the first to third rotary elements RE1 to RE3 are caused to be unitarily rotatable. Thus, increasing the rotation speed $N_{M1}$ of the first electric motor M1 (RE2), as shown by an arrow $AR_1$ in FIG. 10, causes the rotation speed $N_E$ of the engine 8 (RE1) to be raised to rotate at the same speed or nearly same speed as the rotation speed $N_{M1}$. This results in an increase in the third rotary element RE3 connected to the power transmitting member 18 acting as an input shaft of the automatic shifting portion 20. However, since the first and second clutches C1 and C2 remain disengaged, the engine rotation speed $N_E$ can be raised even if the C0-lock control is executed during the halt of the vehicle.

Further, although the engine start-up means 80 drives the first electric motor M1 to increase the engine rotation speed $N_E$, the second electric motor M2 may be driven to increase the engine rotation speed $N_E$ because the C0-control allows the power distributing mechanism 16 to be placed in the non-differential state or the nearly non-differential state. This enables the first to third rotary elements RE1 to RE3 to be unitarily rotated. In another alternative, both the first and second electric motors M1 and M2 may be driven to increase the engine rotation speed $N_E$.

Figure 11:
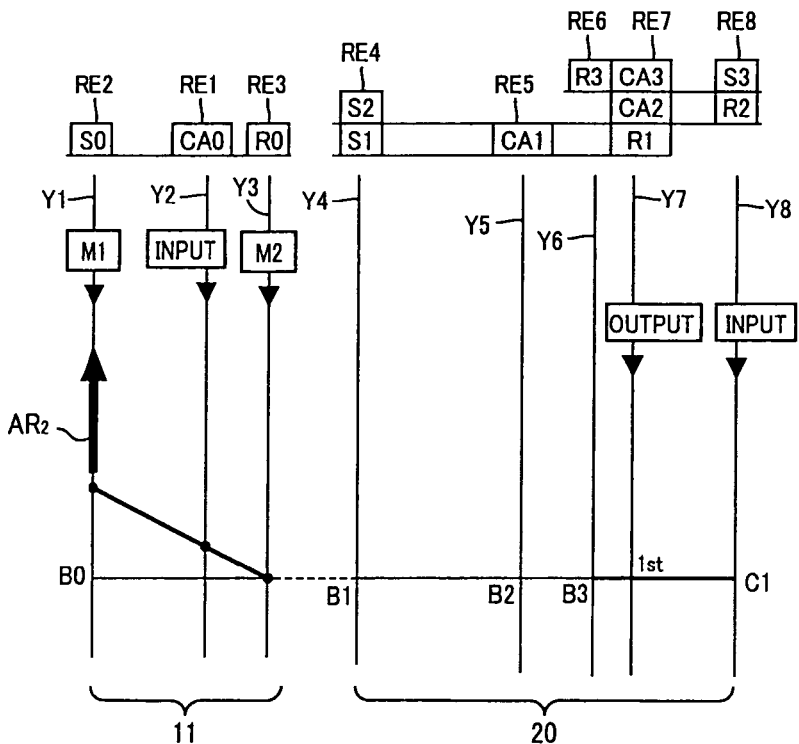
FIG. 11 is a collinear chart, illustrating the relative speed of the associated rotary elements in the differential portion occurring when raising the engine rotation speed to start-up the engine upon disengaging the switching clutch in the vehicular hybrid vehicle drive apparatus shown in FIG. 1.

If the engine start-up determining means 70 determines that the engine start-up command is output and the abnormal noise determining means 72 makes a negative determination that rattling gear noise does not exceed the given value, then, the power distributing mechanism 16 remains under the differential state due to absence of the C0-lock control. The engine start-up means 80 controls the second electric motor M2 so as to allow the related rotation speed $N_{M2}$ to be zeroed as indicated on a collinear chart shown in FIG. 11. This allows the differential-portion ring gear R0 (RE3) to be fixed in non-rotation, under which the first electric motor M1 (RE1) is driven. This increases the first-motor rotation speed $N_{M1}$ as indicated by an arrow $AR_2$ in FIG. 11, thereby increasing the rotation speed $N_E$ of the engine 8 (RE1) up to a value beyond the given rotation speed available to achieve the engine start-up. At timing when the engine rotation speed $N_E$ is raised to the value beyond the given rotation speed, the engine start-up means 80 initiates the engine ignition, thereby starting up the engine 8.

Although the second electric motor M2 fixedly retains the differential-portion ring gear R0 (RE3) not to rotate the same, an engaging element such as a clutch, a brake or the like may be possibly used to fixedly retain the differential-portion ring gear R0 (RE3) in a way not to rotate the same. In the illustrated embodiment, the engine start-up means 80 drives the first electric motor M1 so as to increase the engine rotation speed $N_E$. However, since the first and second clutches C1 and C2 basically remain disengaged during the halts of the vehicle and the engine, the second electric motor M2 may be driven to increase the engine rotation speed $N_E$ while interrupting the operation of the first electric motor M1 for non-rotation. In addition, both the first and second electric motors M1 and M2 may be driven to increase the engine rotation speed $N_E$.

Figure 12:
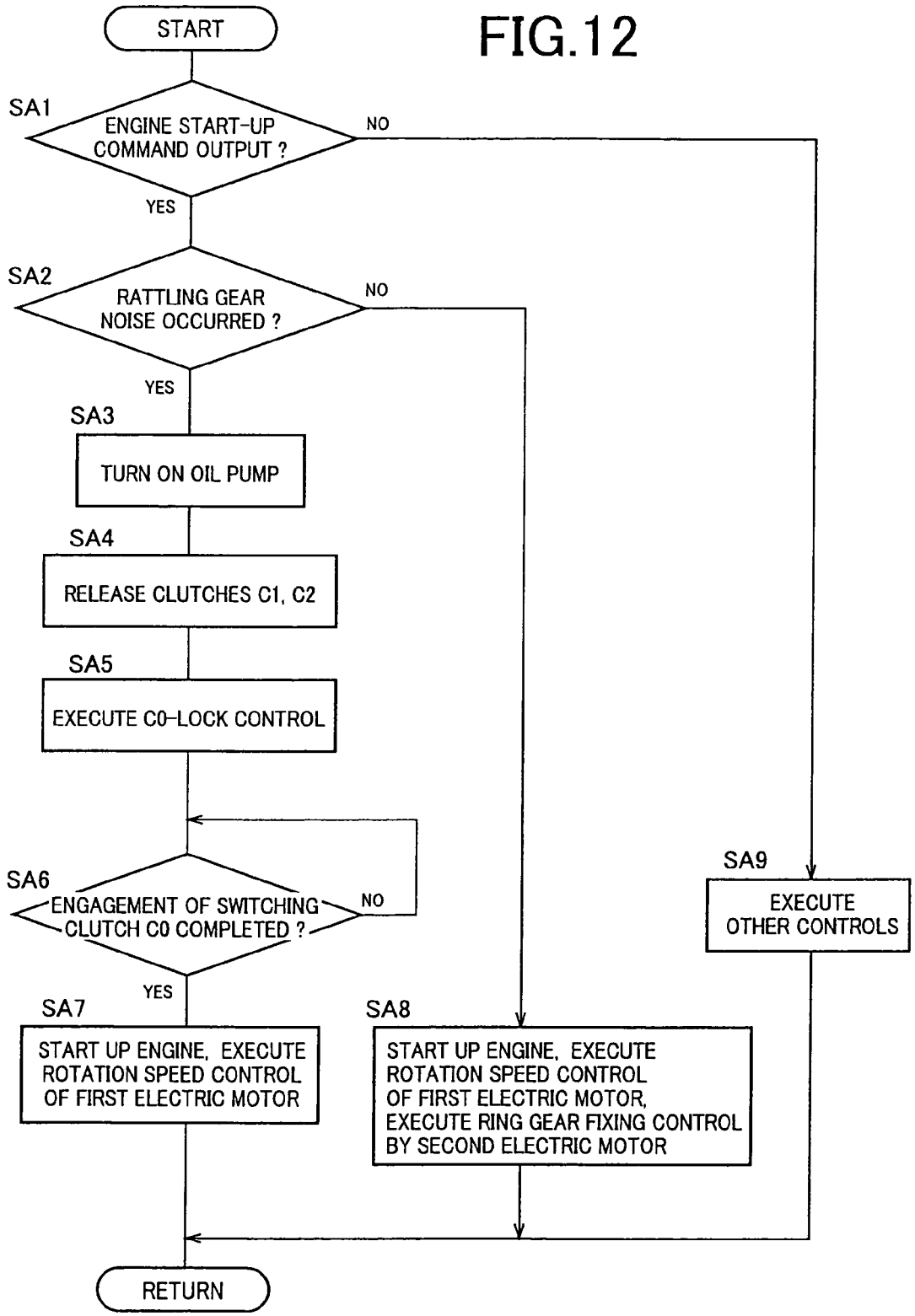
FIG. 12 is a flowchart illustrating a basic sequence of major control operations to be executed with the electronic control device shown in FIG. 4, i.e., a basic control operations to be executed for minimizing rattling gear noise in a power distributing mechanism occurring during the start-up of the engine.

FIG. 12 is a flowchart illustrating a basic sequence of major control operations to be executed with the electronic control device 40, i.e., a basic sequence of control operations for minimizing rattling gear noise of the power distributing mechanism 16. This sequence is repeatedly executed in an extremely short cycle time in the order of approximately, for instance, several milliseconds to several tens milliseconds.

First, under a situation where the vehicle or the engine 8 remains halted, in step (hereinafter the term "step" will be omitted) SA1 corresponding to the engine start-up determining means 70, the operation is executed to determine whether or not an engine start-up command is output representing a start-up request on the engine 8. If this determination is made positive, i.e., if the engine start-up command is output, the operation goes to SA2. In contrast, if this determination is made negative, the operation proceeds to SA9.

In SA2 corresponding to the abnormal noise determining means 72, the operation is executed to predict and determine whether or not rattling gear noise resulting from backlashes of gears in the power distributing mechanism 16, i.e., rattling gear noise resulting from the power distributing mechanism 16, exceeds a given value. More particularly, the engine temperature determining value is determined so as to correspond to a given value on rattling gear noise based on the correlation between the temperature of the engine 8 and the magnitude of rattling gear noise preliminarily obtained on experimental tests. If the temperature of the engine 8 is less than the engine temperature determining value, then, the operation is executed to regard that rattling gear noise exceeds the given value, thereby making the determination as mentioned above. If this determination is made positive, i.e., when a prediction is made that rattling gear noise exceeds the given value, then, the operation proceeds to SA3. In contrast, if this determination is made negative, then the operation goes to SA8.

In SA3 corresponding to the hydraulic pressure supply means 74, the oil pump 46 is turned on and, thereafter, the operation proceeds to SA4.

In SA4 corresponding to the power transmitting path switching means 76, the first and second clutches C1 and C2 are disengaged, thereby interrupting the power transmitting path between the differential portion 11 and the automatic shifting portion 20. In addition, all of the clutches C0 to C2 and the brakes B0 to B3 basically remain disengaged during the halts of the vehicle and the engine. Thus, disengagement of the first and second clutches C1 and C2 is confirmed.

In SA5, the C0-lock control is executed to allow the switching clutch C0 to be engaged. This limits or restricts the relative rotation between the first and second rotary elements RE1 and RE2. Thereafter, the operation goes to SA6.

In SA6, during execution of the C0-lock control, the operation is executed to determine whether or not the switching clutch C0 is disengaged. If this determination is made positive, i.e. if the engagement of the switching clutch C0 is completed, then, the operation goes to SA7. If the determination is made negative, then, the execution of SA6 is continued. Accordingly, as the C0-lock control begins to be executed, the operation to engage the switching clutch C0 is continuously executed until the engagement of the switching clutch C0 is completed. Also, SA5 and SA6 collectively correspond to the claimed differential state switching means 78.

In SA7, the start-up of the engine 8 is initiated with the switching clutch C0 remains engaged. In particular, executing the C0-lock control allows the power distributing mechanism 16 to be placed in the non-differential state or the nearly non-differential state under which the first to third rotary elements RE1 to RE3 are made unitarily rotatable. Therefore, driving the first electric motor M1 (RE2) to increase the related rotation speed $N_{M1}$ in a manner as indicated by the arrow $AR_1$ in FIG. 10 allows the rotation speed $N_E$ of the engine 8 (RE1) to increase at the same speed or the nearly same speed as the rotation speed $N_{M1}$. When the engine rotation speed $N_E$ is raised to a value beyond a given rotation speed available to achieve the start-up of the engine, fuel is ignited to start up the engine 8.

In SA8, the engine 8 is started up with the switching clutch C0 remains disengaged. More particularly, the power distributing mechanism 6 is placed in the differential state. As indicated by the collinear chart shown in FIG. 11, the second electric motor M2 is controlled so as to zero the related rotation speed $N_{M2}$ to cause the differential-portion ring gear R0 (RE3) to be fixed for non-rotation, upon which the first electric motor M1 (RE2) is driven. As indicated by the arrow $AR_2$ in FIG. 11, the first-motor rotation speed $N_{M1}$ increases to raise the rotation speed $N_E$ of the engine 8 (RE1) to a value beyond the given rotation speed available to initiate the engine start-up. When the engine rotation speed $N_E$ is raised to the value exceeding the given rotation speed, fuel is ignited to start up the engine 8. In addition, SA7 and SA8 collectively correspond to the claimed engine start-up means 80.

Moreover, in SA9, due to absence of initiated start-up of the engine 8, the other control is executed.

Figure 13:
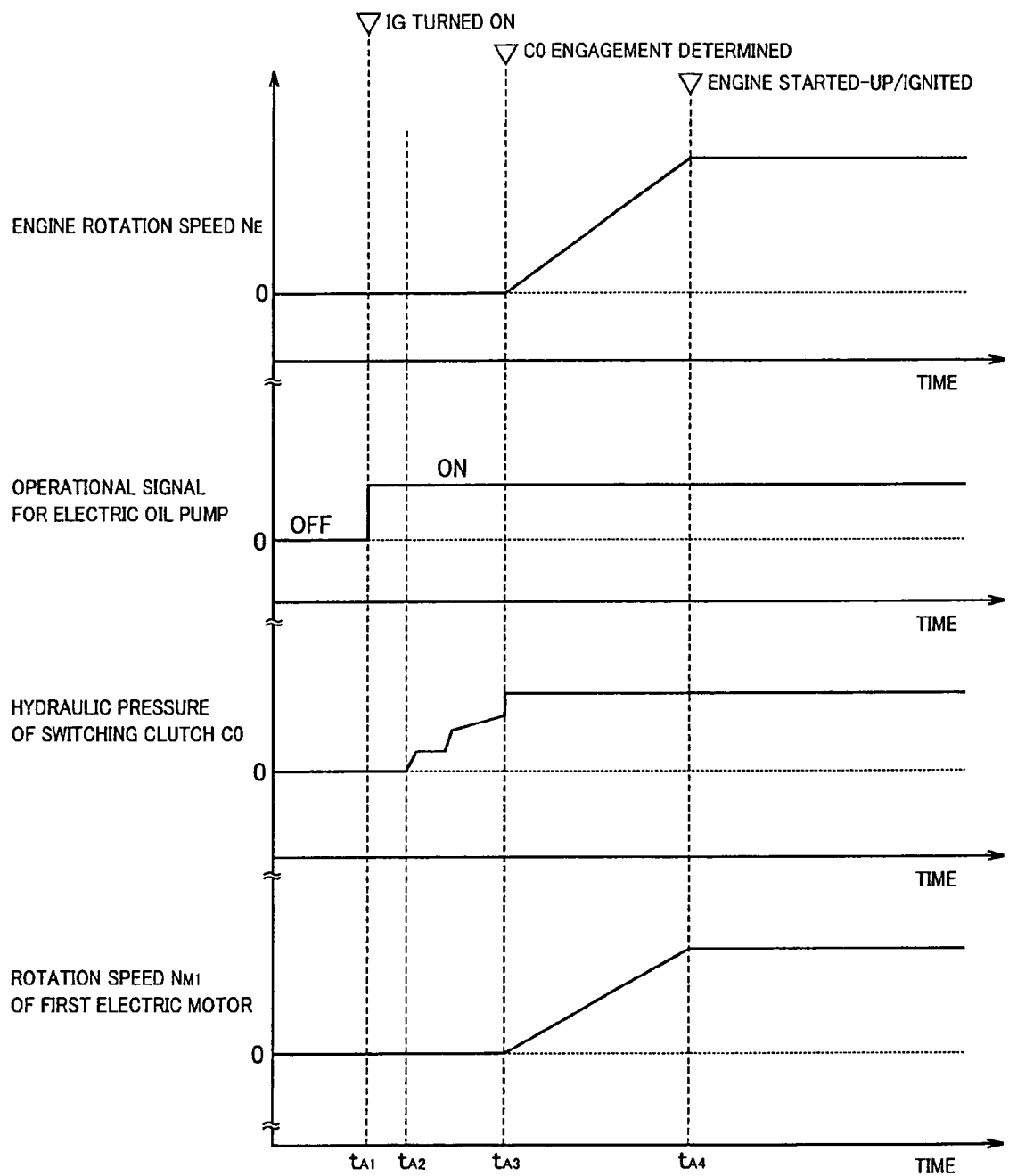
FIG. 13 is a timing chart, illustrating the control operations shown in the flowchart in FIG. 12, which represents an example of a case in which during a halt of a vehicle, rattling gear noise is predicted to exceed a given value after which the engine is started up.

FIG. 13 is a timing chart, illustrating the control operations shown in the flowchart of FIG. 12, which represents an exemplary case wherein during a halt of a vehicle, a prediction is made that rattling gear noise exceeds a given value upon which the engine 8 is started up.

Time instant $t_{A1}$ in FIG. 13 shows turn-off of an ignition switch. Then, the operation is executed in SA1, shown in FIG. 12, to determine that the engine start-up command is output and, subsequently, a prediction is made in SA2 that rattling gear noise resulting from the power distributing mechanism 16 exceeds the given value. Therefore, in SA3, the electric oil pump 46 is started up and, at time instant $t_{A1}$ in FIG. 13, an actuation signal (drive command signal) for the oil pump 46 is shifted from a turned-off state to a turn-on state.

Time instant $t_{A2}$ in FIG. 13 represents the beginning of the C0-lock control being executed. Here, the hydraulic pressure of the switching clutch C0 is raised at time instant $t_{A2}$ in delay from time instant $t_{A1}$ at which the oil pump 46 is started up. This is because the actuating oil temperature $TEMP_{OIL}$ remains at a low level which needs a time to increase the hydraulic pressure.

Time instant $t_{A3}$ represents that the engaging pressure of the switching clutch C0 reaches a target value at which the engagement of the switching clutch C0 is completed. Then, the determination is made in SA6, in FIG. 12, that the engagement of the switching clutch C0 is completed. Then, in SA7, the first electric motor M1 is driven to increase the related rotation speed $N_{M1}$, thereby increasing the engine rotation speed $N_E$. Thus, the first-motor rotation speed $N_{M1}$ and the engine rotation speed $N_E$ are increasing during a period from time instant $t_{A3}$ to time instant $t_{A4}$ in FIG. 13.

Time instant $t_{A4}$ in FIG. 13 represents that the engine rotation speed $N_E$ reaches the given rotation speed available to start up the engine at which the engine ignition is initiated to start up the engine 8. At time instant $t_{A4}$, the control of driving the first electric motor M1 to raise the engine rotation speed $N_E$ is terminated.

Figure 14:
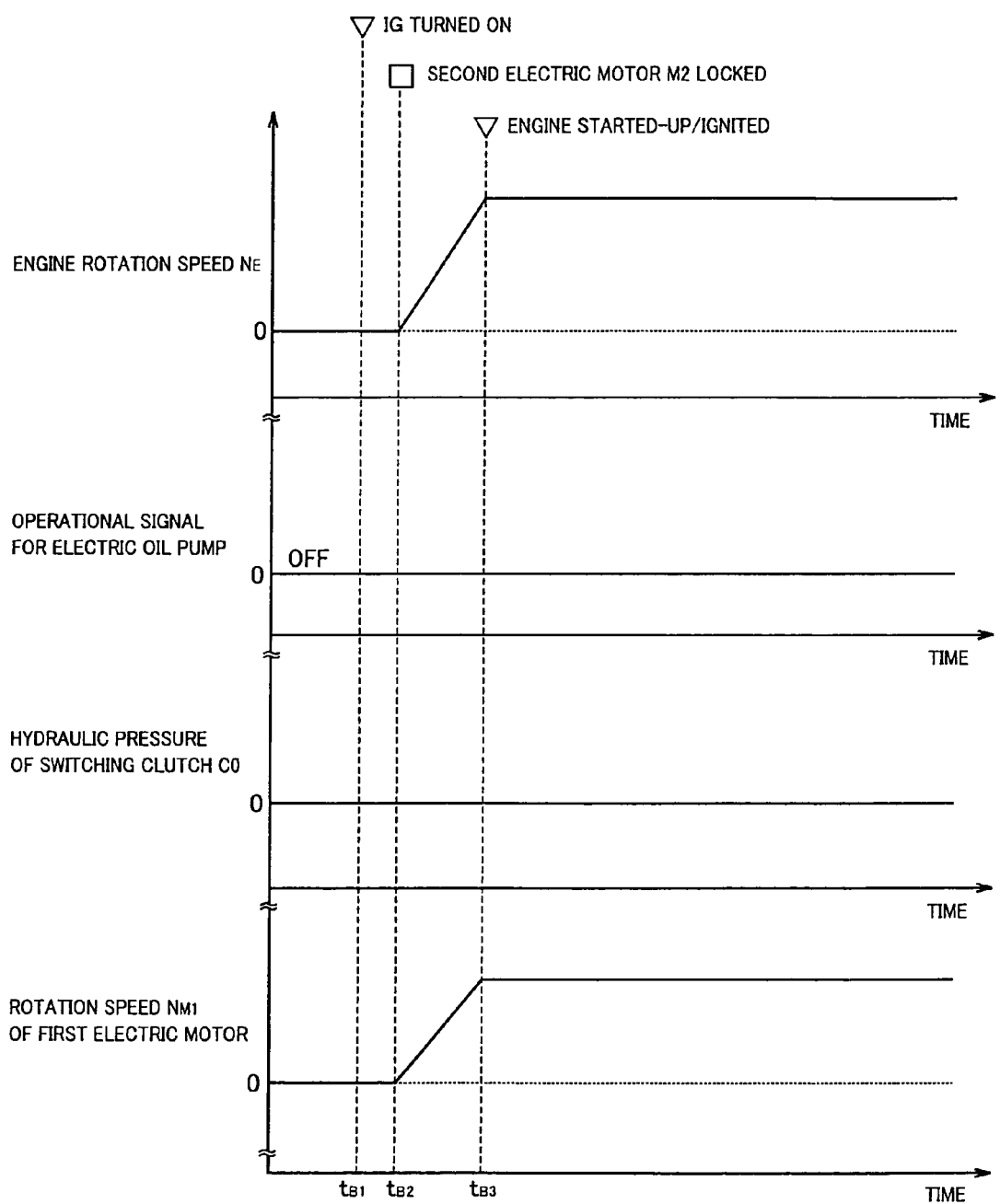
FIG. 14 is a timing chart, illustrating the control operations shown in the flowchart in FIG. 12, which represents an example of another case in which during the halt of the vehicle, a prediction is made that no rattling gear noise exceeds the given value after which the engine is started up.

FIG. 14 is a timing chart, illustrating the control operations indicated in the flowchart of FIG. 12, which represents another exemplary case wherein during the halt of the vehicle, the prediction is made that no rattling gear noise exceeds the given value upon which the engine 8 is started up.

Time instant $t_{B1}$ in FIG. 14 shows turn-on of the ignition switch. Then, the determination is made in SA1 of FIG. 12 that the engine start-up command is output. However, since the prediction is made in SA2 that rattling gear noise, resulting from the power distributing mechanism 16, does not exceed the given value, no operation is executed in SA3 for starting up the electric oil pump 46. In this moment, the actuation signal (drive command signal) for the oil pump 46 remains turned off in FIG. 14. Due to absence of operation of SA5, no C0-lock control is executed. Thus, no increase occurs in the hydraulic pressure of the switching clutch C0.

Time instant $t_{B2}$ in FIG. 14 represents the first electric motor M1 is driven to begin an increase in the first-motor rotation speed $N_{M1}$. In this moment, the operation is executed in SA8 of FIG. 12 in which the second electric motor M2 is controlled so as to zero the related rotation speed $N_{M2}$ to fixedly retain the differential-portion ring gear R0 for non-rotation. Then, due to the differential action conducted in the power distributing mechanism 16, the engine rotation speed $N_E$ begins increasing at time $t_{B2}$ in line with the first-motor rotation speed $N_{M1}$. Increasing the first-motor rotation speed $N_{M1}$ during a period from time instant $t_{B2}$ to time instant $t_{B3}$ results in an increase in the engine rotation speed $N_E$.

Time instant $t_{B3}$ represents that the engine rotation speed $N_E$ reaches the given rotation speed available to achieve the engine start-up upon which the engine ignition is initiated to start up the engine 8. At time instant $t_{B3}$, the operation is terminated, which controls the second electric motor M2 so as to zero the related rotation speed $N_{M2}$ while driving the first electric motor M1 to raise the engine rotation speed $N_E$.

The electronic control device 40 of the present embodiment has various advantageous effects (A1) to (A8) as listed below.

(A1) When the engine start-up command is output, if the determination is made that rattling gear noise, caused in the power distributing mechanism 16, exceeds the given value, the first and second clutches C1 and C2 are disengaged to cause the power transmitting path to be placed in the power interrupting state. Under such a state, the C0-lock control is executed causing the power distributing mechanism 16 to be placed in the non-differential state, under which the engine 8 is started up. That is, the engine 8 is started up with the limitation or the restriction on the rattling between the gears incorporated in the power distributing mechanism 16. This reduces rattling gear noise resulting from the power distributing mechanism 16 during the start-up of the engine 8.

(A2) If rattling gear noise in the power distributing mechanism 16 is less than the given value, then, the start-up of the engine 8 is permitted with the power distributing mechanism 16 placed in the differential state. Therefore, no switching clutch C0 is engaged in absence of a need for placing the power distributing mechanism 16 in the differential state, and the switching clutch C0 is properly engaged when needed.

(A3) If the temperature of the engine 8 is less than the given engine temperature determining value, then, it is regarded that rattling gear noise caused in the power distributing mechanism 16 exceeds the given value and the determination is made whether or not rattling gear noise exceeds the given value. Thus, the determination on rattling gear can be made easily.

(A4) If the actuating oil temperature $TEMP_{OIL}$ of the automatic shifting portion 20 remains at an extremely low temperature, in general, it is probable that even if the oil pump 46 is actuated, no output hydraulic pressure immediately increases with some time necessary in increasing the output hydraulic pressure.

With the present embodiment, in executing the C0-lock control, the presence of the output hydraulic pressure of the oil pump 64 exceeding the give value allows the determination to be made that the oil pump 46 is started up, after which the engagement of the switching clutch C0 is commenced. Further, the completed engagement of the switching clutch C0 is detected with a hydraulic switch operated in response to the engagement pressure of the switching clutch C0 and the engine start-up is initiated after the engagement of the switching clutch C0 is completed.

In other words, it can be said that even if there necessitates some time for increasing the output hydraulic pressure after start-up of the oil pump 46, the engine 8 is started up based on a rise time for increasing the output hydraulic pressure of the oil pump 46. Accordingly, when the C0-lock control is executed, even if it takes a long rise time for increasing the output hydraulic pressure of the oil pump 46, it becomes to avoid the engine from starting up before the engagement of the switching clutch C0 is completed.

(A5) In a case where it is predicted that rattling gear noise resulting from the power distributing mechanism 16 exceeds the given value during the start-up of the engine 8, the power distributing mechanism 16 is placed in the non-differential state. More particularly, upon engagement of the switching clutch C0, the power distributing mechanism 16 is placed in the non-differential start or the nearly non-differential state, under which the first to third rotary elements RE1 to RE3 are made unitarily rotatable. This suppresses the rattling between the gears of the power distributing mechanism 16, thereby enabling a reduction in rattling gear noise resulting from the power distributing mechanism 16 during the start-up of the engine 8.

(A6) Controlling the second electric motor M2 so as to zero the related rotation speed $N_{M2}$ causes the third rotary element RE3 to be fixedly retained, and driving the first electric motor M1 allows the rotation speed of the second rotary element RE2 to increase. This increases the rotation speed $N_E$ of the engine 8 connected to the first rotary element RE1. Thus, the engine 8 can be started up without starting up the oil pump 46 to actuate the switching clutch C0.

(A7) In the illustrated embodiment, the engine start-up means 80 drives the first electric motor M1 to increase the engine rotation speed $N_E$. However, the second electric motor M2 may be driven to increase the engine rotation speed $N_E$. Further, both the first and second electric motors M1 and M2 may be driven to increase the engine rotation speed $N_E$, thereby minimizing a bias load on one electric motor.

(A8) When the engine start-up is initiated with the first and second clutches C1 and C2 remained disengaged, the connection between the first to third planetary gear sets 26, 28 and 30 of the automatic shifting portion 20 and the power distributing mechanism 16 is interrupted. This minimizes a vibration occurring during a power transfer from the engine 8 or the power distributing mechanism 16 to the first to third planetary gear sets 26, 28 and 30. This reduces abnormal noise such as rattling gear noise caused by the first to third planetary gear sets 26, 28 and 30.

Next, another embodiment of the present invention will be described. In the following description, the component parts common to various embodiments bear like reference numerals to omit redundant description.

Second Embodiment

During a phase in which the engine 8 is halted, the engine rotation speed $N_E$ transits a resonating region involved in the engine rotation speed region. Therefore, like the first embodiment described above, even when stopping the engine 8 during the halt of the vehicle, rattling gear noise tends to occur with a level impairing a comfort of a vehicle occupant. To address such an issue, a control operation is executed for minimizing rattling gear noise in a manner as described below.

Figure 15:
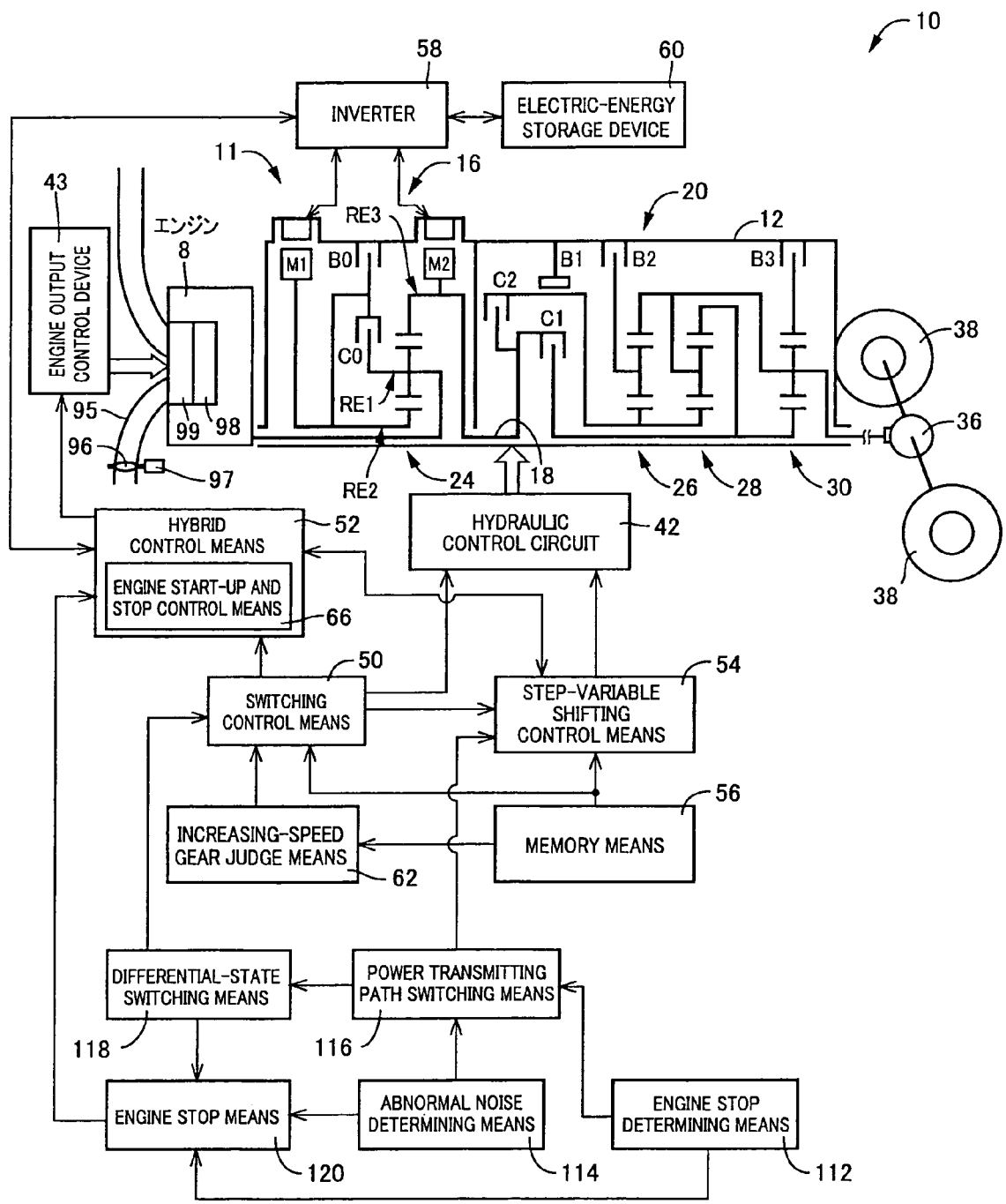
FIG. 15 is a functional block diagram, illustrating a major control function to be executed by the electronic control device shown in FIG. 4, which represents a second embodiment separate from the first embodiment shown in FIG. 7.

The second embodiment represents a structure wherein the electronic control device 40 of the first embodiment is replaced by an electronic control device 110. FIG. 15 is a view, corresponding to FIG. 7, which represents a functional block diagram illustrating a major control function to be executed with the electronic control device 110 of the second embodiment. Hereunder, the second embodiment will be described below with a focus on points differing from those of the first embodiment.

The electronic control device 110 includes, in addition to the hybrid control means 52, the step-variable shift control means 54, the memory means 56 and the speed-increasing gear position determining means 62, engine stop determining means 112, abnormal noise determining means 114, power transmitting path switching means 116 and differential-state switching means 118.

When the engine 8 is driven with the vehicle remains halted, the engine stop determining means 112, shown in FIG. 15, determines whether or not an engine stop command representing a stop request on the engine 8 is output. For instance, when the ignition switch is turned off or where the state of charge SOC of the battery 60 reaches a full charge state with no need arising for causing the first electric motor M1 to generate electric power, the engine stop command is output. Also, the engine 8 is stopped in response to the occurrence of the engine stop command being output and at time when the engine stop command is output, the engine 8 remains in a driving state.

The abnormal noise determining means 114 predicts and determines whether or not rattling gear noise resulting from the power distributing mechanism 16 exceeds a given value, determined on experimental tests in consideration of whether rattling gear noise impairs the comfort of the vehicle occupant. To describe about such a determination in more detail, the viscosity of actuating oil varies such that the higher the temperature $TEMP_{OIL}$ of actuating oil of the automatic shifting portion 20 used as lubricating oil to lubricating the power distributing mechanism 16, the lower will be the viscosity of actuating oil. Thus, this easily results in the rattling between the gears of the power distributing mechanism 16 with a tendency of an increase in rattling gear noise.

An oil temperature determining value is set to be in line with a given value on rattling gear noise by referring to the correlation between the temperature $TEMP_{OIL}$ of actuating oil, preliminarily obtained on the experimental tests, and a level of rattling gear noise. In a case where the temperature $TEMP_{OIL}$ of actuating oil exceeds the oil temperature determining value, the abnormal noise determining means 114 regards that rattling gear noise exceeds the given value and makes the determination as described above.

Further, if no determination is made that rattling gear noise exceeds the given value, then, the abnormal noise determining means 114 permits the engine stop means 120 to stop the engine 8 with the power distributing mechanism 16 remained in the differential state. In the illustrated embodiment, the prediction is made based on the temperature $TEMP_{OIL}$ of actuating oil as to whether or not rattling gear noise exceeds the given value. However, the present invention is not limited to such a concept, and the operation may be executed based on other detection values to predict whether or not rattling gear noise exceeds the given value.

If the engine stop determining means 112 determines that the engine stop command is output and the abnormal noise determining means 114 makes a positive determination that rattling gear noise exceeds the given value, then, the power transmitting path switching means 116 disengages the first and second clutches C1 and C2. This disconnects the power transmitting path between the differential portion 11 and the automatic shifting portion 20. Thus, the power transmitting path, extending from the engine 8 or the differential portion 11 to the drive wheels 38, is placed in the power interrupting state.

During the halt of the vehicle, since all of the clutches C0 to C2 and the brakes B0 to B3 are basically disengaged, the power transmitting path switching means 116 confirms that the first and second clutches C1 and C2 remain disengaged.

Upon disengagements of the first and second clutches C1 and C2, the differential-state switching means 118 executes the C0-lock control in the same way as that executed by the differential-state switching means 78 of the first embodiment. As the C0-lock control begins to be executed, the operation is executed to confirm that the engagement of the switching clutch C0 is completed during the C0-lock control. Thus, the differential-state switching means 118 effectuated upon disengagement of the first and second clutches C1 and C2, differs from the condition under which the differential-state switching means 78 is executed, but is identical to the differential-state switching means 78 in other respect.

When the engagement of the switching clutch C0 is completed upon execution of the C0-lock control, the engine stop means 120 stops the engine 8.

If the engine stop determining means 112 determines that the engine stop command is output and the abnormal noise determining means 114 makes the positive determination that rattling gear noise exceeds the given value, then, the engine stop means 120 causes the engine 8 to stop with the power distributing mechanism 16 remained in the differential state.

Figure 16:
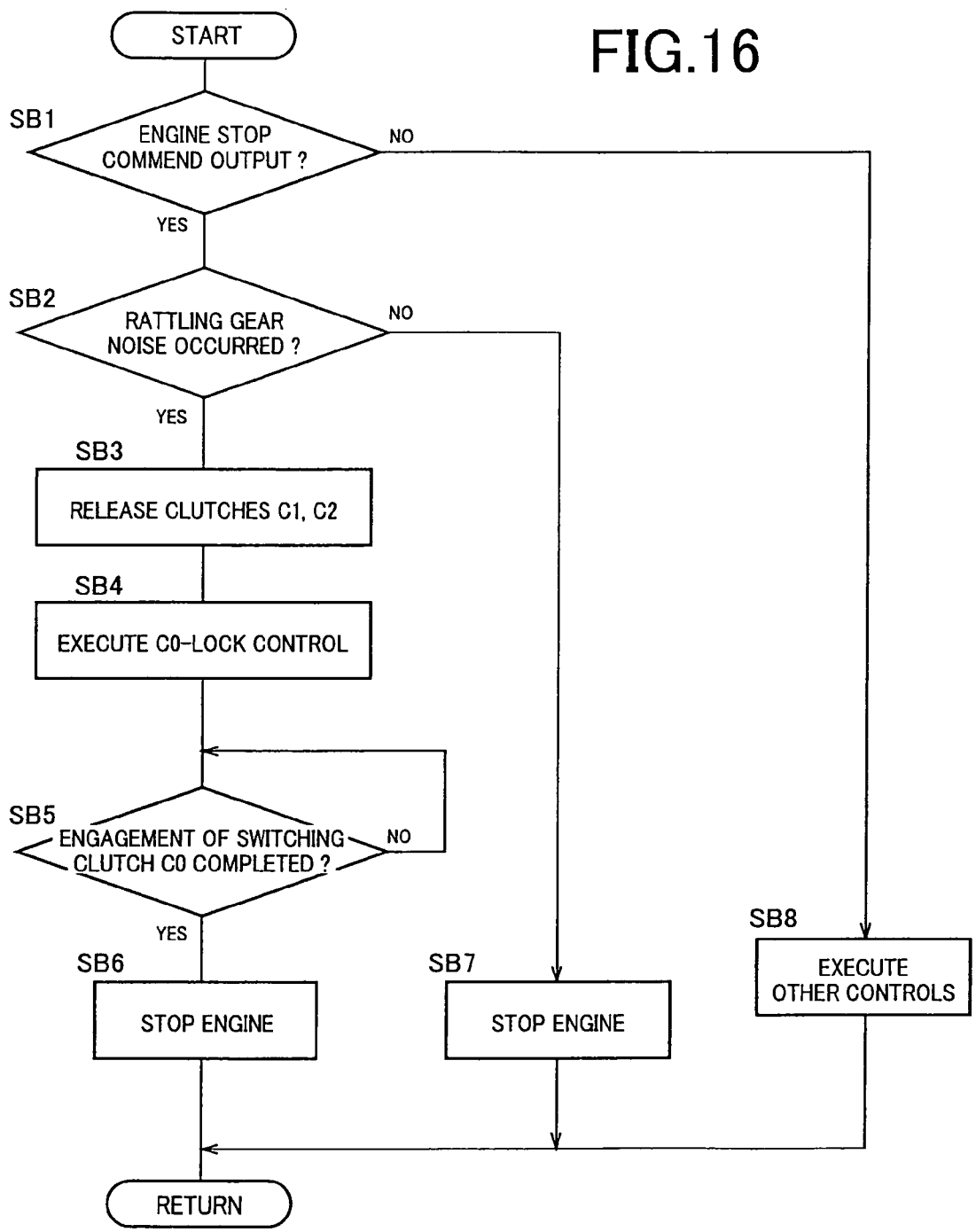
FIG. 16 is a flowchart, illustrating a basic sequence of major control operations to be executed with the electronic control device shown in FIG. 4, i.e., a basic control operations to be executed for minimizing rattling gear noise in the power distributing mechanism occurring during a halt of the engine, which is related to the second embodiment separate from the embodiment shown in FIG. 12.

FIG. 16 is a flowchart illustrating a basic sequence of major control operations to be executed with the electronic control device 110, i.e., control operations to be executed for minimizing rattling gear noise of the power distributing mechanism 16. FIG. 16 corresponds to FIG. 12, and SB3 to SB5 thereof represent steps corresponding to SA4 to SA6 shown in FIG. 12. Hereunder, description will be mainly made with reference to FIG. 16 with a focus on points different from those of FIG. 12. Also, SB3 corresponds to the power transmitting path switching means 116, and SB4 and SB5 collectively correspond to the differential-state switching means 118.

First, when the engine 8 is driven with the vehicle remains halted, in SB1 corresponding to the engine stop determining means 112, the operation is executed to determine whether or not the engine stop command, representing a request of stopping the engine 8, is output. If this determination is made positive, i.e. if the engine stop command is output, then, the operation proceeds to SB2. In contrast, if this determination is made negative, then, the operation goes to SB8.

In SB2 corresponding to the abnormal noise determining means 114, the operation is executed to predict and determine whether or not rattling gear noise, resulting from the rattling of the gears of the power distributing mechanism 16, i.e. whether or not rattling gear noise of the power distributing mechanism 16 exceeds the given value. More particularly, the oil temperature determining value is determined in line with a given value related to rattling gear noise by using the correlation between the actuating oil temperature $TEMP_{OIL}$ of the automatic shifting portion 20, preliminarily obtained on experimental tests, and a level of rattling gear noise. If the actuating oil temperature $TEMP_{OIL}$ becomes higher than the oil temperature determining value, the abnormal noise determining means 114 regards that rattling gear noise of the power distributing mechanism 16 exceeds the given value, thereby making the determination as set forth above.

If this determination is made positive, i.e. if the prediction is made that rattling gear noise of the power distributing mechanism 16 exceeds the given value, then, the operation proceeds to SB3. On the contrary, if this determination is made negative, then, the operation goes to SB7.

If the determination is made positive in SB5, i.e. if the engagement of the switching clutch C0 is completed, then, the operation proceeds to SB6, in which the operation is executed to stop the engine 8. Even in SB7, the engine 8 is caused to stop. Also, SB 6 and SB7 collectively correspond to the engine stop means 120.

In SB8, the other control is executed with stopping the engine 8.

The electronic control device 110 of the second embodiment has various advantageous effects (B1) to (B5) as described below.

(B1) When the engine stop command is output, if the determination is made that rattling gear noise of the power distributing mechanism 16 exceeds the given value, the first and second clutches C1 and C2 are disengaged to cause the power transmitting path to be placed in the power interrupting state. In this moment, the C0-lock control is executed to stop the engine 8. Therefore, the engine 8 is caused to stop under a state in which the rattling between the gears incorporated in the power distributing mechanism 16 is limited or restricted.

(B2) If rattling gear noise in the power distributing mechanism 16 is less than the given value, the engine is permitted to stop with the power distributing mechanism 16 placed in the differential state. Therefore, if no need arises for placing the power distributing mechanism 16 in the non-differential state, no switching clutch C0 is engaged, and it is appropriately caused to engage when needed.

(B3) In general practice, the viscosity of actuating oil varies such that the higher the actuating oil temperature TEMP$_{OIL}$ of the automatic shifting portion 20, the lower will be the viscosity of actuating oil. Thus, the power distributing mechanism 16 lubricated with such actuating oil easily has increased rattling with a resultant increase in rattling gear noise.

With the second embodiment, in contrast, if the actuating oil temperature TEMP$_{OIL}$ exceeds the oil temperature determining value, then, the operation is executed to regard that rattling gear noise, resulting from the power distributing mechanism 16, exceeds the given value, thereby making the determination as to whether or not rattling gear noise exceeds the given value. This makes the determination on rattling gear noise. Further, if the actuating oil temperature TEMP$_{OIL}$ exceeds the oil temperature determining value, then, the power distributing mechanism 16 is placed in the non-differential state to stop the engine 8. Thus, in a case where the ratting is liable to occur in the power distributing mechanism 16 due to the drop in viscosity of actuating oil, the power distributing mechanism 16 is placed in the non-differential state, and the switching clutch C0 is appropriately engaged when needed.

(B4) If it is predicted that during the operation to stop the engine 8, rattling gear noise resulting from the power distributing mechanism 16 exceeds the given value, the power distributing mechanism 16 is placed in the non-differential state. More particularly, the switching clutch C0 is engaged to cause the power distributing mechanism 16 to be placed in the non-differential state under which the first to third rotary elements RE1 to RE3 are unitarily rotatable. This suppresses the occurrence of the rattling between associated rotary elements of the power distributing mechanism 16, thereby enabling a reduction in rattling gear noise caused in the power distributing mechanism 16 upon stopping the engine 8.

(B5) In a case where the first and second clutches C1 and C2 are disengaged while stopping the engine 8, the operation is executed to interrupt the connection between the first to third planetary gear sets 26 to 30 of the automatic shifting portion 20 and the power distributing mechanism 16. This reduces vibration transferred from the engine 8 or the power distributing mechanism 16 to the first to third planetary gear sets 26 to 30, thereby minimizing abnormal noise such as rattling gear noise caused in to the first to third planetary gear sets 26 to 30.

<Modified Deformation>

In the foregoing, while the present invention is described above with reference to the various embodiments, the embodiments described are meant to be illustrative only of mere examples of the present invention. The present invention can be implemented in various modifications or improvements in the light of knowledge of those skilled in the art.

For example, in the C0-lock control in the first and second embodiments, the switching clutch C0 is engaged to suppress rattling between each of rotary elements in the power distributing mechanism 16. Accordingly, the switching clutch C0 may be half-engaged i.e. may be slipped instead for being full-engagement. Noted that in the half-engagement of the switching clutch C0, when the rotation speed N$_E$ of the engine is increased using the first electric motor M1 for the start-up thereof, the second electric motor M2 is necessarily driven. Here, the switching clutch C0 in the half-engaged state thereof, limits the relative rotation between the first rotary element RE1 and the second rotary element RE2. In other words, it means to set the upper limitation for the relative rotation speed between the first rotary element RE1 and the second rotary element RE2, or to lower the upper limitation already set for the relative rotation speed.

In the second embodiment, the switching clutch C0 is engaged when both the first and second clutches C1 and C2 are released, in the case where the engine stop command is output and rattling gear noise generated at the power distributing mechanism 16 exceeding the given value is determined. However, rotation speed N$_E$ of the engine 8 which is stopped decreases toward zero, without engaging the switching clutch C0 and with the power distributing mechanism 16 being placed in the differential state. In this case, the third rotary element RE3 is fixed not to rotate, and the reaction force against the rotation speed decrease of the second rotary element RE2 is generated by the first electric motor M1. Such structure can decreases the engine rotation speed N$_E$ with suppressing rattling between the gears in the power distributing mechanism 16 upon stopping the engine 8. Thus, rattling noise generated at the power distributing mechanism 16 can be decreased.

The third rotary element RE3 fixed by the second electric motor M2 not to rotate in the above-mentioned embodiments, may be fixed by the clutch, brake and the like if possible.

The automatic transmission 20 is provided in the first and second embodiments, but the shifting function thereof may be dispensable in the present invention.

Although the differential portion 11 is provided with the second electric motor M2 in the first and second embodiments, the present invention can be applied to the case where no second electric motor M2 is provided.

In the first and second embodiments, the C0-lock control is executed to decrease rattling gear noise generated at the power distributing mechanism 16. However, the C0-lock control may be executed to decrease rattling noise other than rattling gear noise such as abnormal noise generated for example at the bearing. In this case, the determining conditions for SA2 in FIG. 12 and SB2 in FIG. 16 may be altered.

In the first and second embodiments, the differential portion 11 (power distributing mechanism 16) is described as having the function to operate as the electrically controlled continuously variable transmission with the speed ratio γ0 enabled to continuously vary in the value ranging from the minimum value γ0min to the maximum value γ0max. It may suffice for, for instance, the speed ratio γ0 of the differential portion 11 not to be continuously varied but to be stepwise varied upon daringly utilizing the differential action.

In the shifting mechanism 10 of the first and second embodiments, although the engine 8 and the differential portion are directly connected to each other the engine 8 is sufficiently connected to the differential portion 11 via a clutch engaging element such as a clutch.

In the shifting mechanism 10 of the first and second embodiments, the first electric motor M1 and the second rotary element RE2 are directly connected, and the second electric motor M2 and the third rotary element RE3 are directly connected. However, the first and second electric motors M1 and M2 may be connected to the second and third rotary elements RE2 and RE3 respectively indirectly via engaging element such as clutch and the like.

In the first and second embodiments, in the power transmitting path extended from the engine 8 to the drive wheel 38, although the automatic transmission 20 is disposed next to the differential portion 11, the differential portion 11 may be disposed next to the automatic transmission 20. In summary, the automatic transmission 20 is sufficiently disposed to form a part of the power transmitting path extended from the engine 8 to the drive wheel 38.

In the first and second embodiments, the differential portion 11 and the automatic shifting portion 20 are connected to each other in series in the structure shown FIG. 1. However, the present invention can be applied to a structure even if the differential portion 11 and the automatic shifting portion 20 are mechanically independent from each other, provided that a whole of the shifting mechanism 10 has a function to achieve an electrically controlled differential action enabling a differential state to be electrically varied, and a function to perform a shifting on a principle different from the function of the electrically controlled differential action.

The power distributing mechanism 16 described above as of the single planetary type in the first and second embodiments, may be of a doubled-planetary type.

In the first and second embodiments, the engine 8 is connected to the first rotary element RE1 for drive-force transmissive state, the first electric motor M2 is connected to the second rotary element RE2 for drive-force transmissive state, and the power transmitting path for the drive wheels 38 is connected to the third rotary element RE3. All of the first, second and third rotary elements RE1, RE2 and RE3 are disposed in the differential-portion planetary gear unit 24. However, the present invention may be applied to such a structure including, for instance, two planetary gear units wherein partial rotary elements forming such planetary gear units are connected to each other. With such a structure, the engine, electric motor and drive wheels are connected to the rotary elements of the planetary gear units for drive-force transmissive state such that a clutch or a brake connected to the rotary elements of the planetary gear units, can be controlled to switch a shifting mode between a step-variable shifting mode and a continuously variable shifting mode.

In the first and second embodiments, the second electric motor M2 is directly connected to the power transmitting member 18. However, connecting mode is not limited to this mode, but can be varied. That is, the second electric motor M2 may be directly connected to the power transmitting path extending from the engine 8 or the power transmitting member 18 to the drive wheel 38, or indirectly connected thereto via the transmission, planetary gear unit, engaging device and the like.

In the first and second embodiments, the differential-portion carrier CA0 is connected to the engine 8, the differential-portion sun gear S0 is connected to the first electric motor M1, and the differential-portion ring gear R0 is connected to the transmitting member 18 in the power distributing mechanism 16. However, the connecting relations thereof are not limited to these modes. The engine 8, first electric motor M1, transmitting member 18 may be connected to any one of three rotary elements CA0, S0 and R0 in the differential-portion planetary gear unit 24.

The engine 8 directly connected to the input shaft 14 in the first and second embodiments, may be operatively connected for example with a gear, belt and the like. The engine 8 need not be disposed coaxial with the input shaft 14

In the first and second embodiments, the first and second electric motors M1 and M2 are disposed coaxial with the input shaft 14, and the first electric motor M1 is connected to the differential-portion sun gear S0 and the second electric motor M2 is connected to the power transmitting member 18. However, the disposing and connecting relations thereof are not limited to these modes. For example, the first and second electric motor M1 and M2 are connected to the differential-portion sun gear S0 and the power transmitting member 18 via a gear, belt, speed reduction device and the like.

The power distributing mechanism 16 comprised of one set of the differential-portion planetary gear unit 24 in the first and second embodiments, may be comprised of more than two planetary gear units to function as the transmission having more than three steps or positions in the non-differential state (fixed speed shifting state).

In the first and second embodiments, the second electric motor M2 is connected to the power transmitting member 18 forming the part of the power transmitting path extending from the engine 8 to the drive wheel 38. However, the second electric motor M2 is connected to power transmitting path and is connectable to the power distributing mechanism 16 via the engaging elements such as the clutch. Accordingly, the shifting mechanism 10 may have the structure in which the second electric motor M2, instead for the first electric motor M1, controls the differential state of the power distributing mechanism 16.

The first and second embodiments may be implemented in a mutually combined form upon providing, for instance, a priority order.

What is claimed is:

1. A control device for a hybrid vehicle drive apparatus, wherein
the hybrid vehicle drive apparatus comprises (i) a continuously variable shifting portion including a differential mechanism, operative to distribute an output of an engine to a first electric motor and drive wheels, which serves as an electrically controlled continuously variable transmission; (ii) a connecting/disconnecting portion forming part of a power transmitting path and operative to selectively switch the power transmitting path in one of a power transmissive state in which a power transfer therethrough is allowed, and a power interrupting state in which the power transfer from the differential mechanism to the drive wheels is interrupted; and (iii) a differential state switching device disposed in the differential mechanism and operative to selectively switch the differential mechanism in one of a differential state to enable the continuously variable shifting portion to perform a continuously variable shifting action and a non-differential state disabling the continuously variable shifting action of the continuously variable shifting portion; and
the control device is operative, if rattling noise in the differential mechanism exceeds a given value upon request of an engine start-up, to place the power transmitting path in the power interrupting state and to place the differential mechanism in the non-differential state after which the engine is started up.

2. The control device for the hybrid vehicle drive apparatus according to claim 1, wherein
if the rattling noise in the differential mechanism is less than the given value, the control device places the differential mechanism in the differential state to permit the engine to start up.

3. The control device for the hybrid vehicle drive apparatus according to claim 1, wherein if a temperature of the engine is less than a given engine temperature determining value, the control device determines that the rattling noise in the differential mechanism exceeds the given value.

4. The control device for the hybrid vehicle drive apparatus according to claim 1, wherein the differential state switching device is operative in response to a hydraulic pressure to selectively switch the differential mechanism in one of the differential state and the non-differential state; the hybrid vehicle drive apparatus includes an oil pump for supplying a hydraulic pressure to the differential state switching device; and the control device is operative to start up the engine based on an increasing time of the hydraulic pressure produced by the oil pump.

5. The control device for the hybrid vehicle drive apparatus according to claim 1, wherein the differential mechanism includes a first rotary element connected to the engine in the power transmissive state, a second rotary element connected to the first electric motor in the power transmissive state, and a third rotary element connected to the connecting/disconnecting portion; and in the non-differential state of the differential mechanism, the differential state switching device limits or restricts a relative rotation of at least two rotary elements among the first to third rotary elements.

6. The control device for the hybrid vehicle drive apparatus according to claim 5, wherein the control device is operative, when the differential mechanism is placed in the differential state to start up the engine, the third rotary element is fixedly retained and a rotation speed of the second rotary element is increased by the first electric motor for thereby increasing a rotation speed of the engine.

7. The control device for the hybrid vehicle drive apparatus according to claim 1, wherein the hybrid vehicle drive apparatus further comprises a second electric motor connected to the power transmitting path, and either one of or both of the first and second electric motors are driven to increase a rotation speed of the engine upon starting up the engine.

8. A control device for a hybrid vehicle drive apparatus, wherein
the hybrid vehicle drive apparatus comprises (i) a continuously variable shifting portion including a differential mechanism, operative to distribute an output of an engine to a first electric motor and drive wheels, which serves as an electrically controlled continuously variable transmission; (ii) a connecting/disconnecting portion forming part of a power transmitting path and operative to selectively switch the power transmitting path in one of a power transmissive state in which a power transfer therethrough is allowed, and a power interrupting state in which the power transfer from the differential mechanism to the drive wheels is interrupted; and (iii) a differential state switching device disposed in the differential mechanism and operative to selectively switch the differential mechanism in one of a differential state to enable the continuously variable shifting portion to perform a continuously variable shifting action and a non-differential state disabling the continuously variable shifting action of the continuously variable shifting portion; and
the control device is operative, if rattling noise in the differential mechanism exceeds a given value upon request of an engine stop, to place the power transmitting path in the power interrupting state and to place the differential mechanism in the non-differential state after which the engine is stopped.

9. The control device for the hybrid vehicle drive apparatus according to claim 8, wherein the control device is operative to place the differential mechanism in the differential state to permit the engine to stop, when the rattling noise in the differential mechanism is less than the given value.

10. The control device for the hybrid vehicle drive apparatus according to claim 8, wherein the control device places the differential mechanism in the differential state to allow the engine to stop, when a temperature of lubricating oil for lubricating the differential mechanism exceeds a given oil temperature determining value.

11. The control device for the hybrid vehicle drive apparatus according claim 8, wherein the differential mechanism includes a first rotary element connected to the engine in the power transmissive state, a second rotary element connected to the first electric motor in the power transmissive state, and a third rotary element connected to the connecting/disconnecting portion; and in the non-differential state of the differential mechanism, the differential state switching device limits or restricts a relative rotation of at least two rotary elements among the first to third rotary elements.

12. The control device for the hybrid vehicle drive apparatus according to claim 11, wherein the control device is operative, when the differential mechanism is placed in the differential state to start up the engine, the third rotary element is fixedly retained and a rotation speed of the second rotary element is increased by the first electric motor for thereby increasing a rotation speed of the engine.

13. The control device for the hybrid vehicle drive apparatus according claim 11, wherein the hybrid vehicle drive apparatus further comprises a second electric motor connected to the power transmitting path, and either one of or both of the first and second electric motors are driven to increase a rotation speed of the engine upon starting up the engine.

14. A control device for a hybrid vehicle drive apparatus, wherein
the hybrid vehicle drive apparatus comprises (i) a continuously variable shifting portion including a differential mechanism, operative to distribute an output of an engine to a first electric motor and drive wheels, which serves as an electrically controlled continuously variable transmission; (ii) a connecting/disconnecting portion forming part of a power transmitting path and operative to selectively switch the power transmitting path in one of a power transmissive state in which a power transfer therethrough is allowed, and a power interrupting state in which the power transfer from the differential mechanism to the drive wheels is interrupted; (iii) a differential state switching device disposed in the differential mechanism and operative to selectively switch the differential mechanism in one of a differential state to enable the continuously variable shifting portion to perform a continuously variable shifting action and a non-differential state disable the continuously variable shifting action of the continuously variable shifting portion; and (iv) the differential mechanism including a first rotary element connected to the engine in the power transmissive state, a second rotary element connected to the first electric motor in the power transmissive state, and a third rotary element connected to the connecting/disconnecting portion; and the control device is operative, when rattling noise in the differential mechanism exceeds a given value upon a stop request of the engine for stopping the engine, to place the power transmitting path in the power interrupting state and to place the differential mechanism in the differential state, the control device decreasing a rotation speed of the engine with the third rotary element fixedly retained and a reactive force in opposition to a drop in rotation speed of the second rotary element output by the first electric motor.

* * * * *